United States Patent  
Yamamoto et al.

(10) Patent No.: US 11,002,986 B2  
(45) Date of Patent: May 11, 2021

(54) DISPLAY DEVICE AND METHOD FOR DISPLAYING AERIAL IMAGE

(71) Applicant: Utsunomiya University, Utsunomiya (JP)

(72) Inventors: Hirotsugu Yamamoto, Utsunomiya (JP); Ryosuke Kujime, Utsunomiya (JP)

(73) Assignee: UTSUNOMIYA UNIVERSITY, Utsunomiya (JP)

( * ) Notice: Subject to any disclaimer, the term of this patent is extended or adjusted under 35 U.S.C. 154(b) by 288 days.

(21) Appl. No.: 16/289,048

(22) Filed: Feb. 28, 2019

(65) Prior Publication Data

US 2019/0196213 A1 Jun. 27, 2019

Related U.S. Application Data

(63) Continuation of application No. PCT/JP2017/031448, filed on Aug. 31, 2017.

(30) Foreign Application Priority Data

Aug. 31, 2016 (JP) ................. 2016-170363

(51) Int. Cl.  
*G02B 30/56* (2020.01)

(52) U.S. Cl.  
CPC .................. *G02B 30/56* (2020.01)

(58) Field of Classification Search  
CPC ........ G02B 30/56; G02B 30/50; G02B 5/122; G02B 5/124; G02B 5/126  
USPC ...................................... 359/629  
See application file for complete search history.

(56) References Cited

U.S. PATENT DOCUMENTS

| 5,583,695 A | 12/1996 | Dobrusskin |
| 5,726,806 A * | 3/1998 | Holden .................. G02B 27/01 |
| | | 359/630 |
| 5,861,993 A * | 1/1999 | Shanks .................. G02B 30/56 |
| | | 359/629 |

(Continued)

FOREIGN PATENT DOCUMENTS

| JP | 09-506717 A | 6/1997 |
| JP | 2009-025776 A | 2/2009 |

(Continued)

OTHER PUBLICATIONS

International Search Report dated Nov. 21, 2017, issued in International Application No. PCT/JP2017/031448, filed Aug. 31, 2017, 8 pages.

(Continued)

*Primary Examiner* — William R Alexander  
(74) *Attorney, Agent, or Firm* — Christensen O'Connor Johnson Kindness PLLC

(57) ABSTRACT

A display device as an embodiment of the present invention is provided with a light source, a light splitting portion for causing first emission light emitted from the light source to be surface-reflected as first reflected light, a retro-reflection portion for retro-reflecting the first reflected light toward the light splitting part as retro-reflected light, and a first light blocking portion for blocking surface-reflected light surface-reflected by the retro-reflection part toward an observation position of the retro-reflected light. The light splitting portion is configured to transmit at least some of the retro-reflected light.

18 Claims, 23 Drawing Sheets

(56) References Cited

U.S. PATENT DOCUMENTS

| | | | | |
|---|---|---|---|---|
| 6,147,805 | A | * | 11/2000 | Fergason ........... G02B 27/0172 |
| | | | | 359/630 |
| 9,798,154 | B2 | * | 10/2017 | Powell .................. G02F 1/1334 |
| 10,185,132 | B2 | * | 1/2019 | Suginohara ............ G02B 27/10 |
| 2010/0177402 | A1 | | 7/2010 | Maekawa |
| 2015/0153577 | A1 | * | 6/2015 | Nikitin ..................... G02B 5/12 |
| | | | | 250/200 |
| 2015/0248014 | A1 | * | 9/2015 | Powell ................. G02B 3/0006 |
| | | | | 349/10 |
| 2017/0099480 | A1 | | 4/2017 | Kaneda et al. |
| 2017/0235114 | A1 | * | 8/2017 | Suginohara ............ G02B 17/06 |
| | | | | 359/631 |
| 2017/0261759 | A1 | | 9/2017 | Yamamoto |

FOREIGN PATENT DOCUMENTS

| | | |
|---|---|---|
| JP | 2015-040944 A | 3/2015 |
| JP | 2015-194601 A | 11/2015 |
| WO | 95/16935 A1 | 6/1995 |
| WO | 2016/088683 A1 | 6/2016 |

OTHER PUBLICATIONS

Yamamoto, H., et al., "Floating Aerial LED Signage Based on Aerial Imaging by Retro-Rreflection (AIRR)," Optics Express 22(22):26919-26924, 2014.

* cited by examiner

DISPLAY DEVICE AND METHOD FOR DISPLAYING AERIAL IMAGE

CROSS REFERENCE TO RELATED APPLICATIONS

This application is a continuation of PCT International Application No. PCT/JP2017/031448, filed Aug. 31, 2017, which claims the benefit of Japanese Application No. 2016-170363, filed Aug. 31, 2016. The entire disclosures of said applications are hereby incorporated by reference herein.

BACKGROUND OF THE INVENTION

Field of the Invention

The present invention relates to a display device and a method for displaying an aerial image.

Description of the Related Art

In recent years, in fields including communications/broadcasting, entertainment, art, medical care, and so on, aerial imaging technology capable of displaying images which can be seen without applying special eyeglasses or the like in a three-dimensional space using an environment or a space has received attention. As described above, aerial imaging by retro-reflection (AIRR) is known as one of methods for displaying an image in a three-dimensional space (refer to, for example, H. Yamamoto, Y. Tomiyama, S. Suyama, "Floating aerial LED signage based on aerial imaging by retro-reflection (AIRR)", Optics Express, Vol. 22, No. 22, pp. 26919-26924 (2014)).

As an example of a constitution in which the number of parts is minimized, for example, Published Japanese Translation No. Hei 9-506717 discloses a display device having a beam splitting device placed in a path of light from an object (a light source) and a retro-reflection portion placed in the path of light from the object which is transmitted or reflected by the beam splitting device. In the display device described in Published Japanese Translation No. Hei 9-506717, the beam splitting device is arranged at an opening portion in an opaque surface.

SUMMARY

A display device according to a first aspect of the present invention includes a light source, a light splitting portion which is configured to surface-reflect at least some of first emission light emitted from the light source as first reflected light, a first retro-reflection portion which is configured to retro-reflect at least some of the first reflected light as retro-reflected light toward the light splitting portion, and a first light blocking portion which is configured to block surface-reflected light reflected by the first retro-reflection portion toward an observation position of the retro-reflected light. The light splitting portion is configured to transmit at least some of the retro-reflected light retro-reflected by the first retro-reflection portion.

In the display device according to the present invention, a plurality of light sources may be arranged on one plate surface of a display portion formed in a plate shape. The light splitting portion may be formed in a plate shape. The light splitting portion may have a light splitting surface, which is configured to surface-reflect at least some of the first emission light as the first reflected light, on one plate surface. The one plate surface of the display portion and the light splitting surface may face each other. A separation distance between the one plate surface of the display portion and the light splitting surface may increase from a first end of the display portion to a second end of the display portion. The first retro-reflection portion may be formed in a plate shape. The first retro-reflection portion may have a retro-reflection surface, which is configured to retro-reflect at least some of the first reflected light as the retro-reflected light, on one plate surface. The retro-reflection surface may face the light splitting surface. A first end of the first retro-reflection portion may be in a vicinity of an end of the light splitting portion on a side opposite to a side of the display portion. The first retro-reflection portion may be curved so that a separation distance between the first retro-reflection portion and an end of the light splitting portion on the side of the display portion decreases from the first end to the second end of the first retro-reflection portion.

In the display device according to the present invention, the first light blocking portion may be formed in a plate shape. The first light blocking portion may be disposed on a side of the light splitting surface of the light splitting portion and disposed perpendicular to the light splitting surface. An end of the first light blocking portion on a side of the light splitting portion may be disposed on a first virtual line which connects an end of the display portion on a side opposite to the light splitting portion with an end of the light splitting portion on a side of the first retro-reflection portion.

In the display device according to the present invention, the first light blocking portion may be formed in a plate shape. The first light blocking portion may be disposed on a side of the display portion opposite to the side of the first retro-reflection portion. The first light blocking portion may protrude from the light splitting surface of the light splitting portion to approach the display portion in a direction perpendicular to the light splitting surface.

In the display device according to the present invention, a plurality of light sources may be arranged on one plate surface of a display portion formed in a plate shape. The light splitting portion may be formed in a plate shape. The light splitting portion may have a light splitting surface, which is configured to surface-reflect at least some of the first emission light as the first reflected light, on one plate surface. The one plate surface of the display portion and the light splitting surface may face each other. A separation distance between the one plate surface of the display portion and the light splitting surface may increase from a first end of the display portion to a second end of the display portion. The first retro-reflection portion may be formed in a plate shape. The first retro-reflection portion may be disposed in a direction perpendicular to the light splitting surface. The first retro-reflection portion may have a retro-reflection surface, which is configured to retro-reflect at least some of the first reflected light as the retro-reflected light, on one plate surface. The retro-reflection surface may face the light splitting surface. The first light blocking portion may be formed in a plate shape. An end of the first light blocking portion on a side of the light splitting portion may be disposed on a second virtual line which extends from an end of the first retro-reflection portion on the side of the light splitting portion toward the light source in a direction parallel to the light splitting surface.

In the display device according to the present invention, a plurality of light sources may be arranged on one plate surface of a display portion formed in a plate shape. The light splitting portion may be formed in a plate shape. The light splitting portion may have a light splitting surface, which is configured to surface-reflect at least some of the first emission light as first reflected light, on one plate surface. The one plate surface of the display portion and the light splitting surface may face each other. A separation distance between the one plate surface of the display portion and the light splitting surface may increase from a first end of the display portion to a second end of the display portion. The first retro-reflection portion may be formed in a plate shape. The first retro-reflection portion may be disposed to be spaced apart from a perpendicular axis to the light splitting surface between the display portion and the first retro-reflection portion on the side opposite to the side of the display portion so that a separation distance between the first retro-reflection portion and the perpendicular axis increases at a constant ratio, as moving away from the light splitting portion along the perpendicular axis. The first retro-reflection portion may have a retro-reflection surface, which is configured to retro-reflect at least some of the first reflected light as the retro-reflected light, on one plate surface. The retro-reflection surface may face the light splitting surface. An end of the first light blocking portion on a side of the light splitting portion may be disposed on a third virtual line which extends from an end of the first retro-reflection portion on a side of the light splitting portion toward the light source in a direction perpendicular to the retro-reflection surface.

In the display device according to the present invention, a plurality of light sources may be arranged on one plate surface of a display portion formed in a plate shape. The light splitting portion may be formed in a plate shape. The light splitting portion may have a light splitting surface, which is configured to surface-reflect at least some of the first emission light as the first reflected light, on one plate surface. The one plate surface of the display portion and the light splitting surface may face each other. A separation distance between the one plate surface of the display portion. The light splitting surface may increase from a first end of the display portion to a second end. A second retro-reflection portion may be further included. The second retro-reflection portion may be formed in a plate shape. The second retro-reflection portion may be disposed to be spaced apart from a perpendicular axis to the light splitting surface between the display portion and the second retro-reflection portion on the side opposite to the side of the display portion so that a separation distance between the second retro-reflection portion and the perpendicular axis decreases at a constant ratio, as moving away from the light splitting portion along the perpendicular axis. The second retro-reflection portion may have a retro-reflection surface, which is configured to retro-reflect at least some of the first reflected light as the retro-reflected light, on one plate surface. A retro-reflection surface of the second retro-reflection portion may face the one plate surface of the display portion and the light splitting surface. A plurality of protruding portions which protrude from the retro-reflection surface of the second retro-reflection portion toward the light source in a direction parallel to the light splitting surface may be disposed at predetermined intervals along the retro-reflection surface of the second retro-reflection portion. The first retro-reflection portion may have a retro-reflection surface on one plate surface. The first retro-reflection portion may be provided on a light splitting surface side of the protruding portions. The first light blocking portion may be provided on surfaces of the protruding portions on a side opposite to a side of the light splitting surface.

In the display device according to the present invention, a plurality of light sources may be arranged on one plate surface of a display portion formed in a plate shape. The light splitting portion may be formed in a plate shape. The light splitting portion may have a light splitting surface, which is configured to surface-reflect at least some of the first emission light as the first reflected light, on one plate surface. The one plate surface of the display portion and the light splitting surface may face each other. A separation distance between the one plate surface of the display portion and the light splitting surface may increase from a first end of the display portion to a second end of the display portion. The first retro-reflection portion may be formed in a plate shape. The first retro-reflection portion may have a retro-reflection surface, which is configured to retro-reflect at least some of the first reflected light as the retro-reflected light, on one plate surface. A first end of the first retro-reflection portion may be in a vicinity of the light splitting surface. The first end of the first retro-reflection portion may be disposed to approach the display portion from the first end of the display portion toward the second end of the display portion. The retro-reflection surface may face a side of the light splitting surface. The first light blocking portion may be provided on a plate surface of the first retro-reflection portion on a side opposite to the retro-reflection surface.

The display device according to the present invention may further include a second light blocking portion which is configured to block direct irradiation light directly irradiated to the observation position of the retro-reflected light from the light source. The light splitting portion may transmit at least some of the direct irradiation light.

In the display device according to the present invention, the second light blocking portion may be provided in a region, in which the direct irradiation light is transmitted, on a side of the light splitting portion opposite to a side of the light source.

A display device according to a second aspect of the present invention includes a light source, a light splitting portion which is configured to surface-reflect at least some of first emission light emitted from the light source as first reflected light, a first retro-reflection portion which is configured to retro-reflect at least some of the first reflected light as retro-reflected light toward the light splitting portion, and a second light blocking portion which is configured to block direct irradiation light directly irradiated to an observation position of the retro-reflected light from the light source. The light splitting portion is configured to transmit at least some of the retro-reflected light retro-reflected by the first retro-reflection portion.

A display device according to a third aspect of the present invention includes a display portion formed in a plate shape and has a light source on one plate surface thereof, a light splitting portion formed in a plate shape, disposed on a first emission axis which indicates an emission direction of first emission light emitted from the light source, disposed so that one plate surface thereof is inclined with respect to the one plate surface of the display portion, configured to transmit at least some of the first emission light as first transmitted light and has a light splitting surface which is configured to surface-reflect at least some of the retro-reflected light, on the one plate surface thereof, a first retro-reflection portion formed in a plate shape, having a retro-reflection surface, which is configured to retro-reflect at least some of the first transmitted light transmitted through the light splitting portion as retro-reflected light, on one plate surface thereof, and disposed on the first emission axis so that the retro-reflection surface is parallel to the light splitting surface of the light splitting portion while facing the display portion with the light splitting portion interposed therebetween, and an imaging portion formed in a plate shape, disposed on a first retro-reflection portion side of the light splitting portion along one plate surface of the light splitting portion, and configured to surface-reflect and image retro-reflected light retro-reflected by the first retro-reflection portion.

A display device according to a fourth aspect of the present invention includes a display portion formed in a plate shape and has a light source on one plate surface thereof, a light splitting portion formed in a plate shape, disposed on a first emission axis which indicates an emission direction of first emission light emitted from the light source, having a light splitting surface, which is configured to surface-reflect at least some of the first emission light as first reflected light, on the one plate surface thereof, and disposed so that the light splitting surface is opposed and inclined with respect to the one plate surface of the display portion, a first retro-reflection portion formed in a plate shape, having a retro-reflection surface, which is configured to retro-reflect at least some of the first reflected light surface-reflected by the light splitting surface as retro-reflected light, on one plate surface thereof, and disposed on a second emission axis which indicates a traveling direction of the first reflected light so that the retro-reflection surface is opposed and inclined with respect to the light splitting surface and the retro-reflection surface is perpendicular to one plate surface of the display portion, and an imaging portion formed in a plate shape, disposed on a side of the light splitting portion opposite to a side of the first retro-reflection portion along one plate surface of the light splitting portion, and configured to transmit retro-reflected light retro-reflected by the first retro-reflection portion and to image the first emission light. The light splitting portion is configured to transmit at least some of the retro-reflected light.

A method of displaying an aerial image according to a first aspect of the present invention includes emitting first emission light from a light source and reflecting at least some of the first emission light at a position on a first emission axis, which indicates an emission direction of the first emission light, as first reflected light toward a first retro-reflection portion with a light splitting portion, retro-reflecting at least some of the first reflected light at a position on a second emission axis, which indicates an emission direction of the first reflected light, as retro-reflected light toward the light splitting portion by the first retro-reflection portion, transmitting at least some of the retro-reflected light at the light splitting portion, and blocking surface-reflected light reflected by the first retro-reflection portion to an observation position of the retro-reflected light by a first light blocking portion.

The method of displaying an aerial image according to the present invention may further include blocking direct irradiation light directly irradiated to the observation position of the retro-reflected light from the light source by a second light blocking portion.

A method of displaying an aerial image according to a second aspect of the present invention includes emitting first emission light from a light source and reflecting at least some of the first emission light at a position on a first emission axis, which indicates an emission direction of the first emission light, as first reflected light toward a first retro-reflection portion by a light splitting portion, retro-reflecting at least some of the first reflected light at a position on a second emission axis, which indicates an emission direction of the first reflected light, as retro-reflected light toward the light splitting portion by the first retro-reflection portion, transmitting at least some of the retro-reflected light at the light splitting portion, and blocking direct irradiation light directly irradiated to an observation position of the retro-reflected light from the light source by a second light blocking portion.

In the display device according to the present invention, a plurality of light sources may be arranged on one plate surface of a display portion formed in a plate shape. The light splitting portion may be formed in a plate shape. The light splitting portion may have a light splitting surface, which is configured to surface-reflect at least some of the first emission light as the first reflected light, on one plate surface thereof. The one plate surface of the display portion and the light splitting surface may face each other. A separation distance between the one plate surface of the display portion and the light splitting surface may increase from a first end of the display portion to a second end. The first retro-reflection portion may be formed in a plate shape. The first retro-reflection portion may be disposed to be spaced apart from a perpendicular axis to the light splitting surface between the display portion and the first retro-reflection portion on the side opposite to the side of the display portion so that a separation distance between the first retro-reflection portion and the perpendicular axis changes, as moving away from the light splitting portion along the perpendicular axis. The first retro-reflection portion may have a retro-reflection surface, which is configured to retro-reflect at least some of the first reflected light as the retro-reflected light, on one plate surface thereof. The retro-reflection surface may face the light splitting surface. An end of the first light blocking portion on a side of the light splitting portion may be disposed on a third virtual line which extends from an end of the first retro-reflection portion on a side of the light splitting portion toward the light source in a direction perpendicular to the retro-reflection surface.

In the display device according to the present invention, a plurality of light sources may be arranged on one plate surface of a display portion formed in a plate shape. The light splitting portion may be formed in a plate shape. The light splitting portion may have a light splitting surface, which is configured to surface-reflect at least some of the first emission light as the first reflected light, on one plate surface thereof. The one plate surface of the display portion and the light splitting surface may face each other.

A separation distance between the one plate surface of the display portion and the light splitting surface may increase from a first end of the display portion to a second end. A second retro-reflection portion may be further included. The second retro-reflection portion may be formed in a plate shape. The second retro-reflection portion may be disposed to be spaced apart from a perpendicular axis to the light splitting surface between the display portion and the second retro-reflection portion on the side opposite to the side of the display portion so that a separation distance between the second retro-reflection portion and the perpendicular axis changes, as moving away from the light splitting portion along the perpendicular axis. The second retro-reflection portion may have a retro-reflection surface, which is configured to retro-reflect at least some of the first reflected light as the retro-reflected light, on one plate surface thereof. A retro-reflection surface of the second retro-reflection portion may face the one plate surface of the display portion and the light splitting surface. A plurality of protruding portions which protrude from the retro-reflection surface of the second retro-reflection portion toward the light source in a direction parallel to the light splitting surface may be disposed at predetermined intervals along the retro-reflection surface of the second retro-reflection portion. The first retro-reflection portion may have a retro-reflection surface on one plate surface thereof. The first retro-reflection portion may be provided on a light splitting surface side of the protruding portions. The first light blocking portion may be provided on surfaces of the protruding portions on a side opposite to a side of the light splitting surface.

DETAILED DESCRIPTION OF THE PREFERRED EMBODIMENTS

Hereinafter, embodiments of a display device and a method for displaying an aerial image according to the present invention will be described with reference to the drawings.

The display device according to the present invention includes a light source, a light splitting portion which causes at least some of first emission light emitted from the light source to be surface-reflected as first reflected light, a first retro-reflection portion which is configured to retro-reflect at least some of the first reflected light as retro-reflected light toward the light splitting portion, and a first light blocking portion which blocks the surface-reflected light reflected by the first retro-reflection portion toward an observation position of the retro-reflected light. The light splitting portion is configured to transmit at least some of the retro-reflected light retro-reflected by the first retro-reflection portion.

Hereinafter, an embodiment of the display device according to the present invention will be described.

First Embodiment

Figure 1:
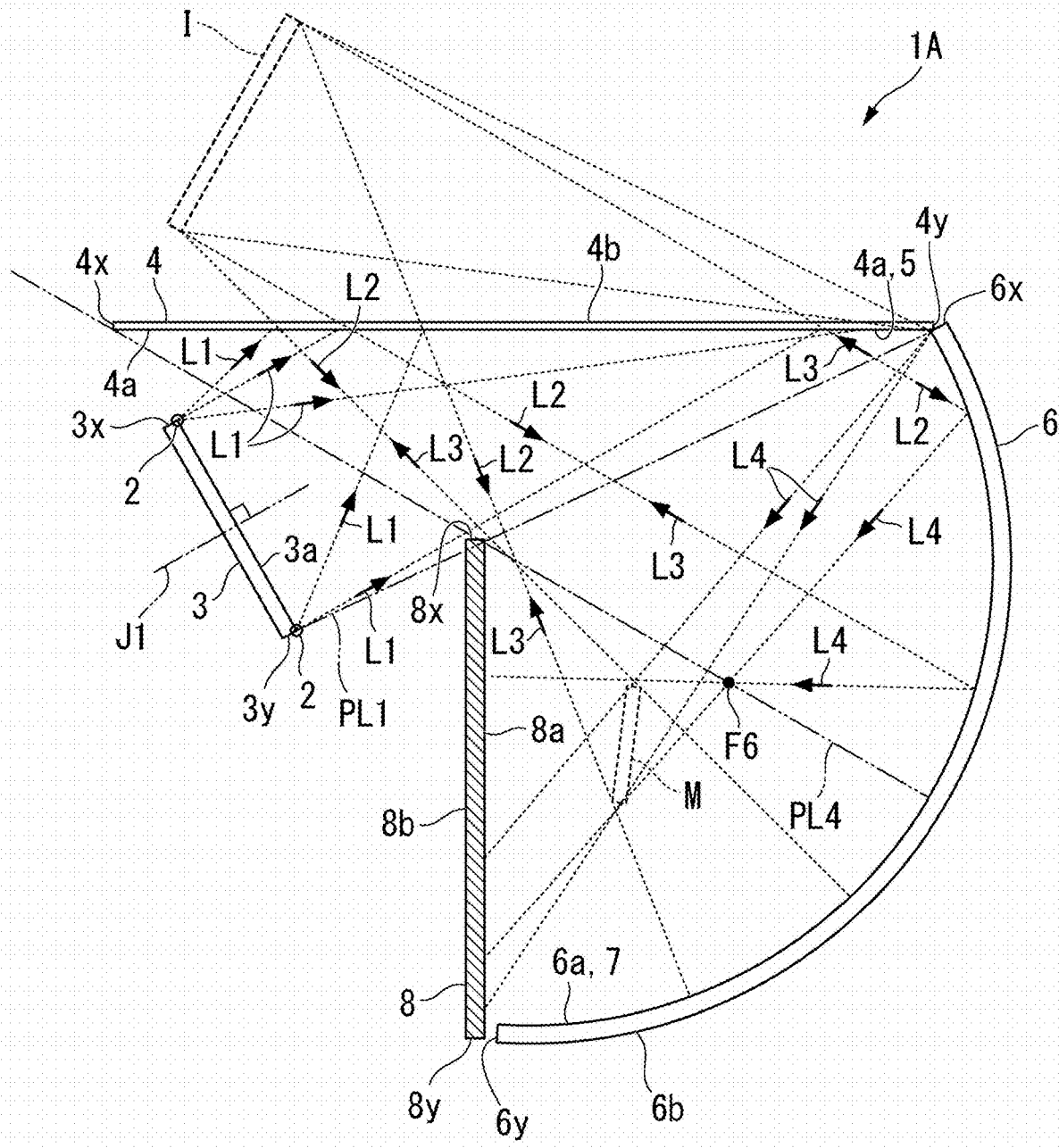
FIG. 1 is a side view showing a constitution of a display device according to a first embodiment of the present invention.

As shown in FIG. 1, the display device 1A according to a first embodiment includes a light source 2, a light splitting portion 4, a retro-reflection portion (a first retro-reflection portion) 6, and a first light blocking portion 8.

The light source 2 is, for example, an LED but is not particularly limited. A plurality of light sources 2 are arranged parallel to one plate surface 3a of a plate-shaped display portion 3. The plurality of light sources 2 are provided so that light emission directions thereof are directed toward a first emission axis J1. The number and the relative arrangement of the light sources 2 are not particularly limited. The display portion 3 is, for example, an LED display or a liquid crystal display.

A light splitting portion 4 is formed in a plate shape. A light splitting surface 5 is provided on one plate surface 4a of the light splitting portion 4. The light splitting surface 5 surface-reflects some of first emission light L1 emitted from the light source 2 as first reflected light L2 and transmits the retro-reflected light retro-reflected by a retro-reflection portion 6.

The light splitting surface 5 faces the plate surface 3a of the display portion 3. Further, the light splitting portion 4 is disposed so that a separation distance between the plate surface 3a of the display portion 3 and the light splitting surface 5 increases from an end (a first end) 3y of the display portion 3 toward an end (a second end) 3y thereof. That is, the light splitting portion 4 is disposed to be inclined at a predetermined angle with respect to the display portion 3.

The light splitting portion 4 is, for example, a plate-shaped member formed of acrylic or glass, a hollow body formed of these materials and accommodating water therein, a plate having an opening column of for example punched metal, a wire grid film, a reflective polarizing film, and others generally called a beam splitter, or the like.

The retro-reflection portion 6 is formed in a plate shape and is bendable. A retro-reflection surface 7 is provided on one plate surface 6a of the retro-reflection portion 6. The retro-reflection surface 7 retro-reflects at least some of the first reflected light L2 as retro-reflected light L3 toward the light splitting surface 5.

The retro-reflection surface 7 faces the light splitting surface 5. An end (a first end) 6x of the retro-reflection portion 6 is connected to an end of the light splitting portion 4 opposite to the display portion 3, that is, an end 4y thereof. Additionally, the retro-reflection portion 6 is curved so that a separation distance between the retro-reflection portion 6 and an end of the light splitting portion 4 on the side of the display portion 3, that is, an end 4x thereof increases and then decreases from the end 6x toward an end (a second end) 6y.

The retro-reflection surface 7 is constituted with a known retro-reflection structure. As the known retro-reflection structure, for example, a plurality of triangular prisms may be formed to be adjacent to each other along the plate surface 6a, or a plurality of semicircular lenses may be formed to be adjacent to each other along the plate surface 6a. In such a retroreflection surface 7, some of the first reflected light L2 is surface-reflected as surface-reflected light L4. The retro-reflection portion 6 is a retro-reflection sheet or the like in which the above-described retro-reflection structure is provided at least on the plate surface 6a.

The retro-reflection portion 6 having the above-described structure can serve as a so-called concave mirror. The surface-reflected light L4 passes through a focal point F6 of the retro-reflection portion 6. The surface-reflected light L4 after passing through the focal point F6, and the surface-reflected light L4 surface-reflected at the end 6x of the retro-reflection portion 6 form a reduced image M. In other words, the arrangement of the retro-reflection portion 6 and so on are designed to form the reduced image M of the surface-reflected light L4 (that is, directly reflected light) or a reduced image of a mirror image with respect to the light splitting portion 4 of the display portion 3 and to form the reduced image M on the side opposite to the light splitting portion 4 with respect to a line connecting the end 3y of the display portion 3 with the end 4y of the light splitting portion 4.

The first light blocking portion 8 is formed in a plate shape and is disposed on the side of the light splitting surface 5 of the light splitting portion 4. That is, the first light blocking portion 8 is disposed on the same side as the display portion 3 and the retro-reflection portion 6 with respect to the light splitting portion 4. Plate surfaces 8a and 8b of the first light blocking portion 8 are disposed perpendicularly to the light splitting surface 5.

An end (a first end) 8x of the first light blocking portion 8 is disposed on a virtual line (a first virtual line) PL1 which connects the end of the display portion 3 on the side opposite to the side of the light splitting portion 4, that is, the end 3y with the end of the light splitting portion 4 on the side of the retro-reflection portion 6, that is, the end 4y.

A position of an end (a second end) 8y of the first light blocking portion 8 is not particularly limited, but is preferably in the vicinity of the end 6y of the retro-reflection portion 6 from the viewpoint of minimizing a size of the first light blocking portion 8. In other words, the first light blocking portion 8 is disposed at a position at which it blocks all the light from the reduced image M of the directly reflected light L4 of the display portion 3 or the reduced image of the mirror image with respect to the display portion 3.

The first light blocking portion 8 is not particularly limited as long as it can block the first emission light L1 or the surface-reflected light L4, and may be, for example, black paper, plastic, a metal plate, Raxa paper, a light absorbing sheet, a keyboard, a display, a frame member, and so on. Further, when a surface of the retro-reflection sheet on the side opposite to the retro-reflection surface has a light blocking property, the retro-reflection sheet may be disposed so that the surface thereof having the light blocking property faces the plate surface 6a of the retro-reflection portion 6, and this retro-reflection sheet may be used as the first light blocking portion 8.

In the display device 1A of the first embodiment, at least some of the first emission light L1 emitted from each of the plurality of light sources 2 disposed on the display portion 3 is surface-reflected as the first reflected light L2 by the light splitting surface 5 of the light splitting portion 4. The first reflected light L2 is incident on the retro-reflection portion 6 and retro-reflected as the retro-reflected light L3 in the same direction as an incident direction by the retro-reflection portion 6. The retro-reflected light L3 is incident on the light splitting surface 5 of the light splitting portion 4, is transmitted through the light splitting portion 4 and forms an aerial image I at a position symmetrical to the light source 2, that is, the display portion 3, with respect to the light splitting surface 5.

According to the above-described display device 1A of the first embodiment, a user can observe a bright aerial image I including a region in which an image could not be observed in a conventional display device in a space on the side opposite to the display portion 3 or the retro-reflection portion 6 with respect to the light splitting portion 4. Also, as can be seen from FIG. 1, the surface-reflected light L4 irradiated to the observation position of the aerial image I is blocked by the first light blocking portion 8, and thus when the user looks at the aerial image I, the reduced image M of the surface-reflected light L4 or the reduced image of the mirror image with respect to the light splitting portion 4 of the display portion 3 is blocked by the first light blocking portion 8. Therefore, it is possible to prevent a false image from being observed by the user.

Figure 2:
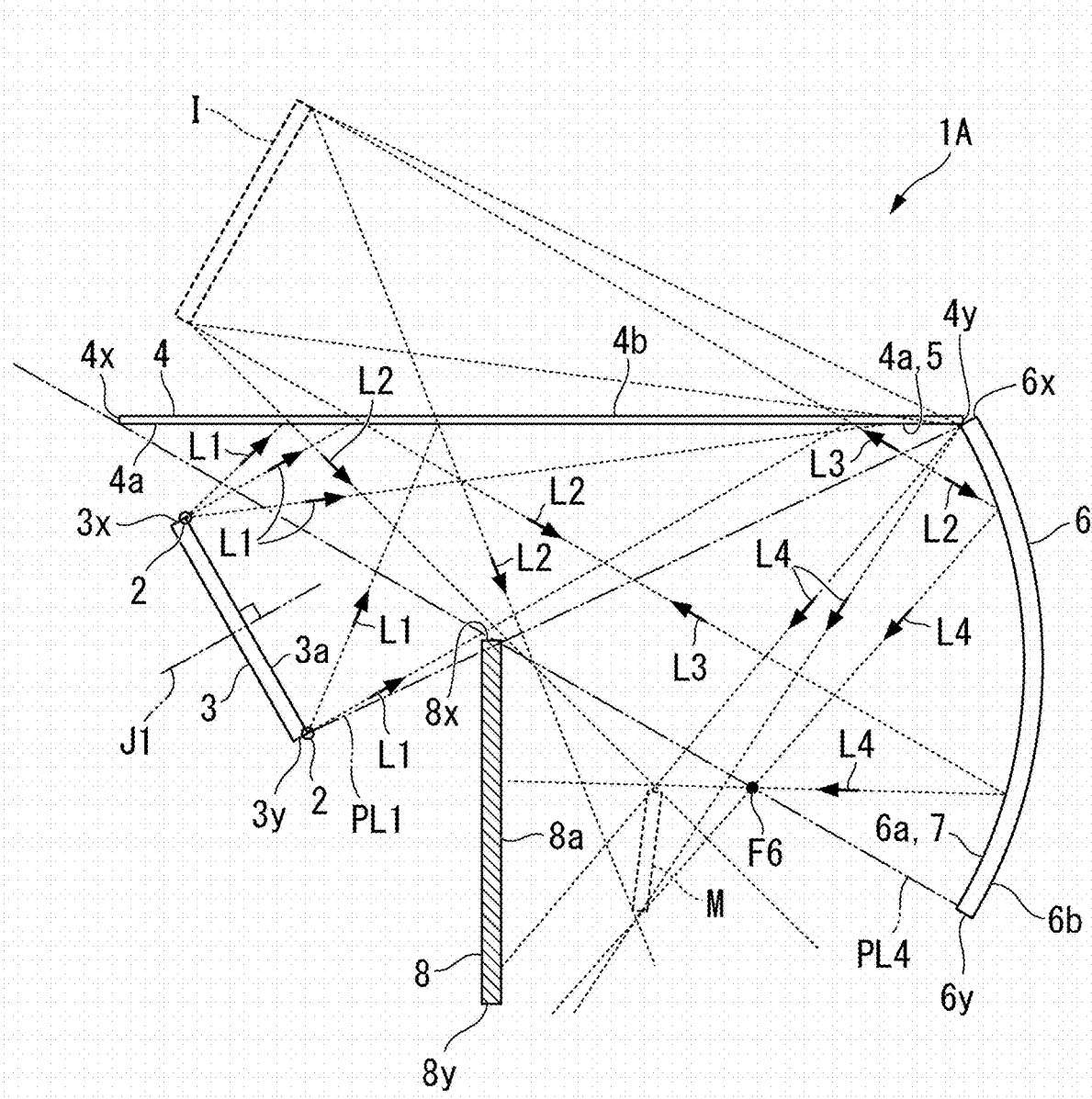
FIG. 2 is a side view showing a range of a retro-reflection portion used in the display device according to the first embodiment of the invention.

Also, as shown in FIG. 2, a necessary range of the retro-reflection portion 6 is a range in the case in which the end 6x of the retro-reflection portion 6 is disposed in the vicinity of the end 4y of the light splitting portion 4 and the end 6y of the retro-reflection portion 6 is disposed at an intersection point between the virtual line PL4 connecting the end 4x of the light splitting portion 4 on the side of the display portion 3 with the focal point F6 and the retro-reflection portion 6, as shown in FIG. 2.

Second Embodiment

Next, a display device 1B according to a second embodiment of the present invention will be described. In the elements of the display device 1B of the second embodiment shown in FIG. 3, the same elements as those of the display device 1A of the first embodiment shown in FIG. 1 and so on are designated by the same reference numerals, and description thereof will be omitted.

Figure 3:
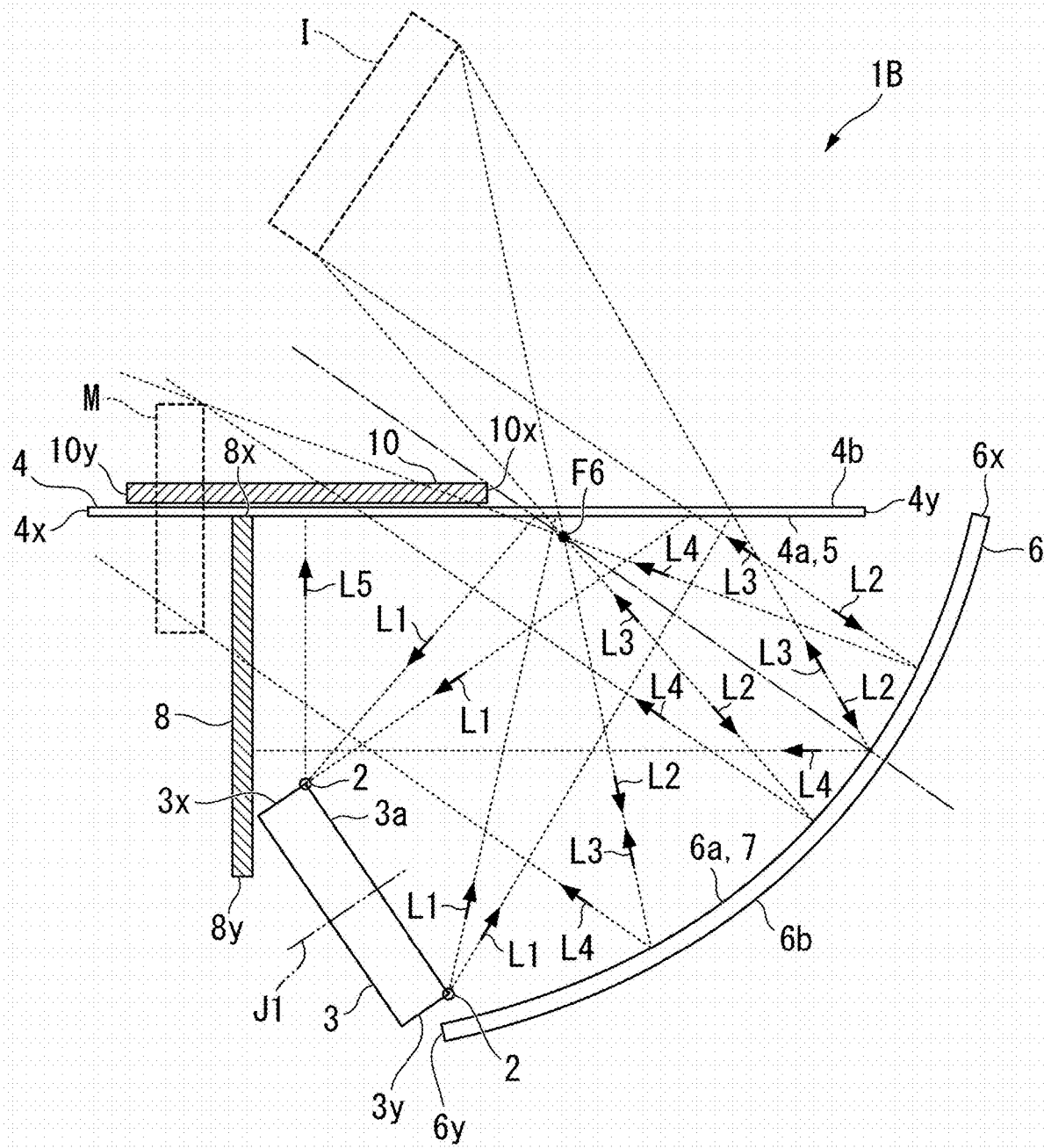
FIG. 3 is a side view showing a constitution of a display device according to a second embodiment of the present invention.

As shown in FIG. 3, the display device 1B includes the same elements as those of the display device 1A and further includes a second light blocking portion 10 which blocks direct irradiation light L5 directly irradiated to the observation position of the retro-reflected light L3, that is, a formation position of the aerial image I.

In the display device 1B, the light splitting surface 5 of the light splitting portion 4 transmits at least some of the direct irradiation light L5.

The retro-reflection portion 6 is curved so that a separation distance between the retro-reflection portion 6 and the end of the light splitting portion 4 on the side of the display portion 3, that is, the end 4x does not increase but decreases from the end 6x toward the end 6y. The end 6x of the retro-reflection portion 6 is separated from the end 4y of the light splitting portion 4.

The first light blocking portion 8 is disposed on the side opposite to the side of the retro-reflection portion 6 of the display portion 3. Further, the first light blocking portion 8 protrudes from the light splitting surface 5 of the light splitting portion 4 in a direction perpendicular to the light splitting surface 5 to approach the display portion 3. That is, the end 8x of the first light blocking portion 8 is disposed on the side of the display portion 3 of the light splitting surface 5. The end 8y of the first light blocking portion 8 is disposed on the side of the light splitting portion 4 of the display portion 3 and in the vicinity of the end 3x on the side opposite to the retro-reflection portion 6.

The second light blocking portion 10 is formed in a plate shape and is provided in a region in which the direct irradiation light L5 is transmitted on the side opposite to the display portion 3 (the light source) of the light splitting portion 4, that is, on the side opposite to the light splitting surface 5. Further, the second light blocking portion 10 is disposed on the side opposite to the display portion 3 and the retro-reflection portion 6 with respect to the light splitting portion 4.

An end (a first end) 10x of the second light blocking portion 10 is disposed in the vicinity of an intersection position of the surface-reflected light L4 closest to the end 4y of the light splitting portion 4 among the surface-reflected light L4, which is surface-reflected in the vicinity of the end 6x of the retro-reflection portion 6 and capable of being transmitted through the light splitting surface 5, and the other plate surface 4b of the light splitting portion 4.

A position of an end (a second end) 10y of the second light blocking portion 10 is not particularly limited and is preferably disposed on the plate surface 4a (that is, the light splitting surface 5) of the light splitting portion 4 in the vicinity of the end 8x of the first light blocking portion 8 from the viewpoint of minimizing a size of the second light blocking portion 10. According to such a constitution, the surface-reflected light L4 can be localized.

The second light blocking portion 10 is disposed at a position in which it also blocks the light from the reduced image M of the surface-reflected light L4 or the reduced image of the mirror image with respect to the display portion 3 in addition to the direct irradiation light L5, and also plays an auxiliary role of the first light blocking portion 8.

The second light blocking portion 10 is not particularly limited as long as it can block the direct irradiation light L5 or the surface-reflected light L4 and may be, for example, black paper, plastic, a metal plate, Raxa paper, light absorbing sheet, a keyboard, a display, a frame member, and so on, like the first light blocking portion 8. Further, when a surface of the retro-reflection sheet on the side opposite to the retro-reflection surface has a light blocking property, the retro-reflection sheet may be disposed at the position of the second light blocking portion 10 shown in FIG. 3.

According to the above-described display device 1B of the second embodiment, the same operational effects as those of the display device 1A of the first embodiment can be obtained. Also, according to the display device 1B of the second embodiment, the direct irradiation light L5 irradiated to the observation position of the aerial image I is blocked by the second light blocking portion 10, and thus when the user looks at the aerial image I, a direct image (not shown) of the display portion 3 is blocked by the second light blocking portion 10. Therefore, it is possible to prevent the direct image of the display portion 3 in addition to the false image from being observed by the user.

Third Embodiment

Next, a display device 1C according to a third embodiment of the present invention will be described. In the elements of the display device 1C of the third embodiment shown in FIG. 4, the same elements as those of the display device 1A of the first embodiment shown in FIG. 1 and so on are designated by the same reference numerals, and description thereof will be omitted.

Figure 4:
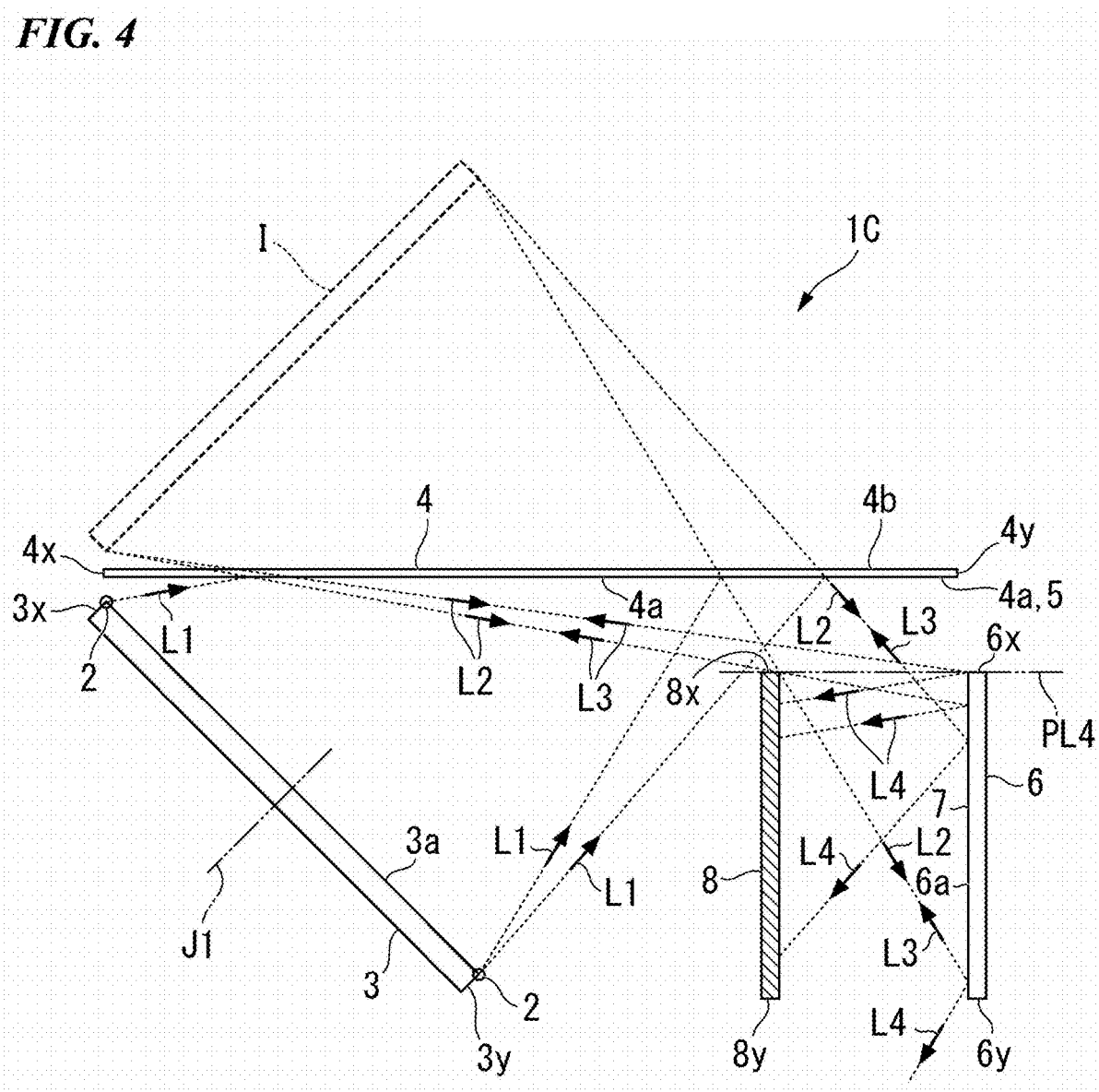
FIG. 4 is a side view showing a constitution of a display device according to a third embodiment of the present invention.

As shown in FIG. 4, the display device 1C includes the same elements as the display device 1A.

However, the retro-reflection portion 6 is disposed in a straight line in a direction perpendicular to the light splitting surface 5 without being curved. The retro-reflection surface 7 faces the light splitting surface 5.

The end 8x of the first light blocking portion 8 on the side of the light splitting portion 4 is disposed on a virtual line (a second virtual line) PL2 which extends from the end 6x of the retro-reflection portion 6 on the side of the light splitting portion 4 toward the light source 2, that is, the display portion 3 in a direction parallel to the light splitting surface 5.

In the display device 1C, as described above, since the retro-reflection surface 7 is disposed perpendicularly to the light splitting surface 5, the surface-reflected light L4 is diffused from the retro-reflection surface 7 toward the first light blocking portion 8. The first light blocking portion 8 is disposed to block at least some of the surface-reflected light L4 diffusing from the retro-reflection surface 7 toward the first light blocking portion 8 from reaching the formation position of the aerial image I. Although the position of the end 8y of the first light blocking portion 8 is not particularly limited, it is appropriately set in consideration of a range in which at least the surface-reflected light L4 reaching the formation position of the aerial image I can be blocked.

That is, the retro-reflection portion 6 and the first light blocking portion 8 face each other.

According to the display device 1C of the third embodiment, the user can observe a bright aerial image I in a region in which an image could not be observed in a conventional display device in a space on the side opposite to the display portion 3 or the retro-reflection portion 6 with respect to the light splitting portion 4. Further, as can be seen from FIG. 4, the surface-reflected light L4 is blocked by the first light blocking portion 8. Therefore, it is possible to prevent the surface-reflected light L4 itself or the false image from being observed by the user.

Figure 5:
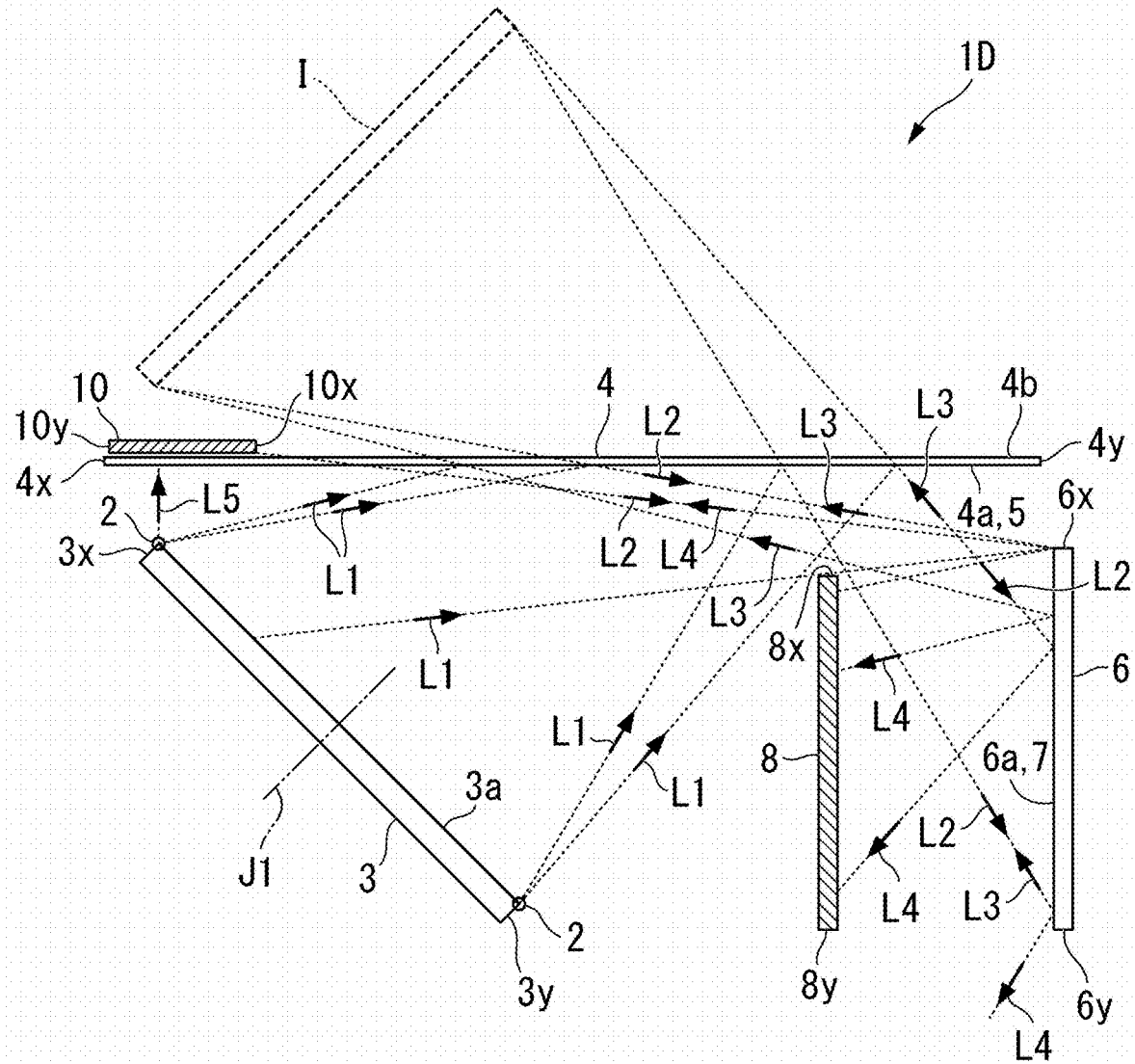
FIG. 5 is a side view showing a constitution of a first modified example of the display device according to the third embodiment of the present invention.

A display device 1D shown in FIG. 5 is a first modified example of the display device 1C.

In the display device 1D, the position of the end 8x of the first light blocking portion 8 moves in a direction away from the light splitting surface 5 more than the position of the end 8x of the first light blocking portion 8 in the display device 1C. Also, in the display device 1D, like the display device 1B of the second embodiment, the second light blocking portion 10 is provided. The second light blocking portion 10 is disposed in a region through which the direct irradiation light L5 is transmitted on the side opposite to the light splitting surface 5 of the light splitting portion 4 and in a region of the light splitting portion 4 through which the surface-reflected light L4 can be transmitted.

According to the display device 1D as the first modified example of the third embodiment, the same operational effects as those of the display device 1C of the third embodiment can be obtained. Also, according to the display device 1D, the direct irradiation light L5 irradiated to the observation position of the aerial image I is blocked by the second light blocking portion 10, and thus when the user looks at the aerial image I, a direct image (not shown) of the display portion 3 is blocked by the second light blocking portion 10. Therefore, it is possible to prevent the direct image of the display portion 3 in addition to the false image from being observed by the user.

Figure 6:
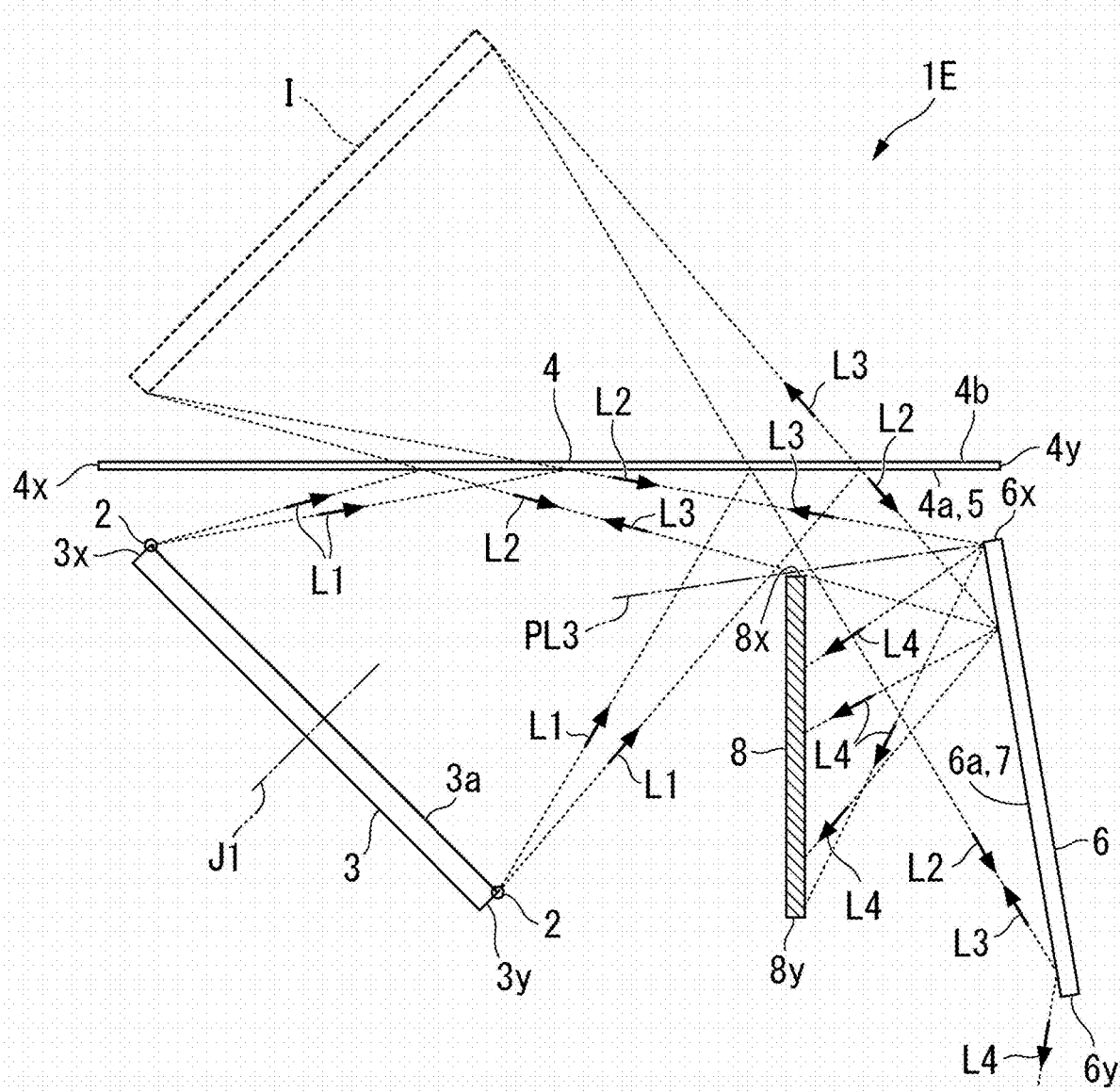
FIG. 6 is a side view showing a constitution of a second modified example of the display device according to the third embodiment of the present invention.

A display device 1E shown in FIG. 6 is a second modified example of the display device 1C.

In the display device 1E, the retro-reflection portion 6 is disposed to be spaced apart from a perpendicular axis (not shown) to the light splitting surface 5 of the light splitting portion 4 between the display portion 3 and the retro-reflection portion 6 on the side opposite to the side of the display portion 3 so that a separation distance between the retro-reflection portion 6 and the perpendicular axis increases at a constant ratio, as moving away from the light splitting portion 4 along the perpendicular axis. That is, the retro-reflection portion 6 is disposed to be inclined to the side opposite to the side of the display portion 3 in the direction perpendicular to the light splitting surface 5.

Further, in the display device 1E, the end 8x of the first light blocking portion 8 is disposed on a virtual line (a third virtual line) PL3 which extends from the end 6x of the retro-reflection portion 6 toward the display portion 3 in the direction perpendicular to the retro-reflection surface 7.

In the display device 1E, as described above, since the retro-reflection portion 6 is inclined to the side opposite to the side of the display portion 3 in the direction perpendicular to the light splitting surface 5, the surface-reflected light L4 is diffused from the retro-reflection surface 7 toward the first light blocking portion 8 at a wider angle, for example, as compared with the display devices 1C and 1D.

According to the display device 1E as the second modified example of the third embodiment, the same operational effects as those of the display device 1C of the third embodiment can be obtained. Also, according to the display device 1E, since the surface-reflected light L4 is diffused from the retro-reflection surface 7 toward the first light blocking portion 8 at a wide angle, it is possible to reduce the surface-reflected light L4 irradiated toward the observation position of the aerial image I and to minimize the size of the first light blocking portion 8.

Figure 7:
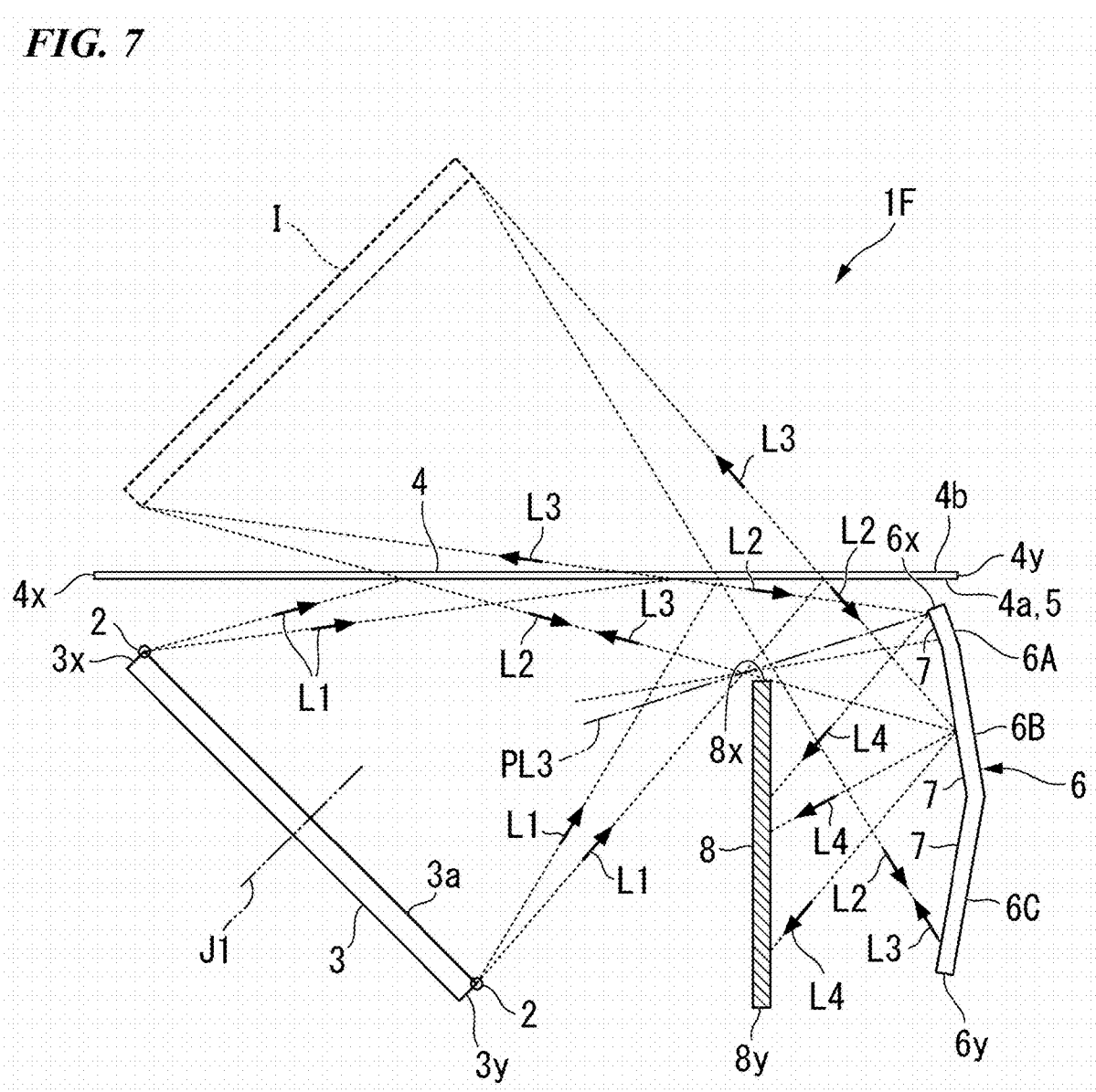
FIG. 7 is a side view showing a constitution of a third modified example of the display device according to the third embodiment of the present invention.

The display device 1F shown in FIG. 7 is a third modified example of the display device 1C and is a further modified example of the display device 1E.

As shown in FIG. 7, the retro-reflection portion 6 may be constituted by connecting a plurality of retro-reflection portions 6A, 6B, 6C, . . . each of which is formed of the above-described retro-reflection sheet or the like and formed in a plate shape. For example, as in the display devices 1A and 1B shown in FIG. 1, a trajectory tracing each of plate surfaces of the plurality of retro-reflection portions 6A, 6B, 6C, . . . is curved so that a separation distance from the end 4x of the light splitting portion 4 increases or decreases as being spaced apart from the side of the light splitting portion 4 in the direction perpendicular to the light splitting surface 5.

In the display device 1F, the end 8x of the first light blocking portion 8 is disposed on the virtual line (the third virtual line) PL3 which extends from an end 6x of a retro-reflection portion 6A disposed closest to the light splitting portion 4 toward the display portion 3 in the direction perpendicular to the retro-reflection surface 7. In the display device 1F, as described above, since the retro-reflection portion 6 is inclined to the side opposite to the side of the display portion 3 in the direction perpendicular to the light splitting surface 5, the surface-reflected light L4 is diffused from the retro-reflection surface 7 toward the first light blocking portion 8 at a wider angle, for example, as compared with the display devices 1C and 1D. Further, a diffusion angle of the surface-reflected light L4 as the whole of the retro-reflection portion 6 can be freely changed by adjusting an angle between the adjacent retro-reflection portions among the retro-reflection portions 6A, 6B, 6C.

According to the display device IF as the third modified example of the third embodiment, the same operational effects as those of the display device 1C of the third embodiment can be obtained. Also, according to the display device 1F, since the surface-reflected light L4 is diffused from the retro-reflection surface 7 toward the first light blocking portion 8 at a desired angle, it is also possible to freely adjust an amount of the surface-reflected light L4 which is irradiated toward the observation position of the aerial image I and to minimize the size of the first light blocking portion 8.

In the display device 1E shown in FIG. 6 and the display device IF shown in FIG. 7, the second light blocking portion 10 may be provided as in the display device 1D shown in FIG. 5. It is possible to block a direct image (not shown) of the display portion 3 by providing the second light blocking portion 10, such that the user cannot see the direct image.

Fourth Embodiment

Next, a display device 1G according to a fourth embodiment of the present invention will be described. In the elements of the display device 1G of the fourth embodiment shown in FIG. 8, the same elements as those of the display device 1A of the first embodiment shown in FIG. 1 and so on are designated by the same reference numerals, and description thereof will be omitted.

Figure 8:
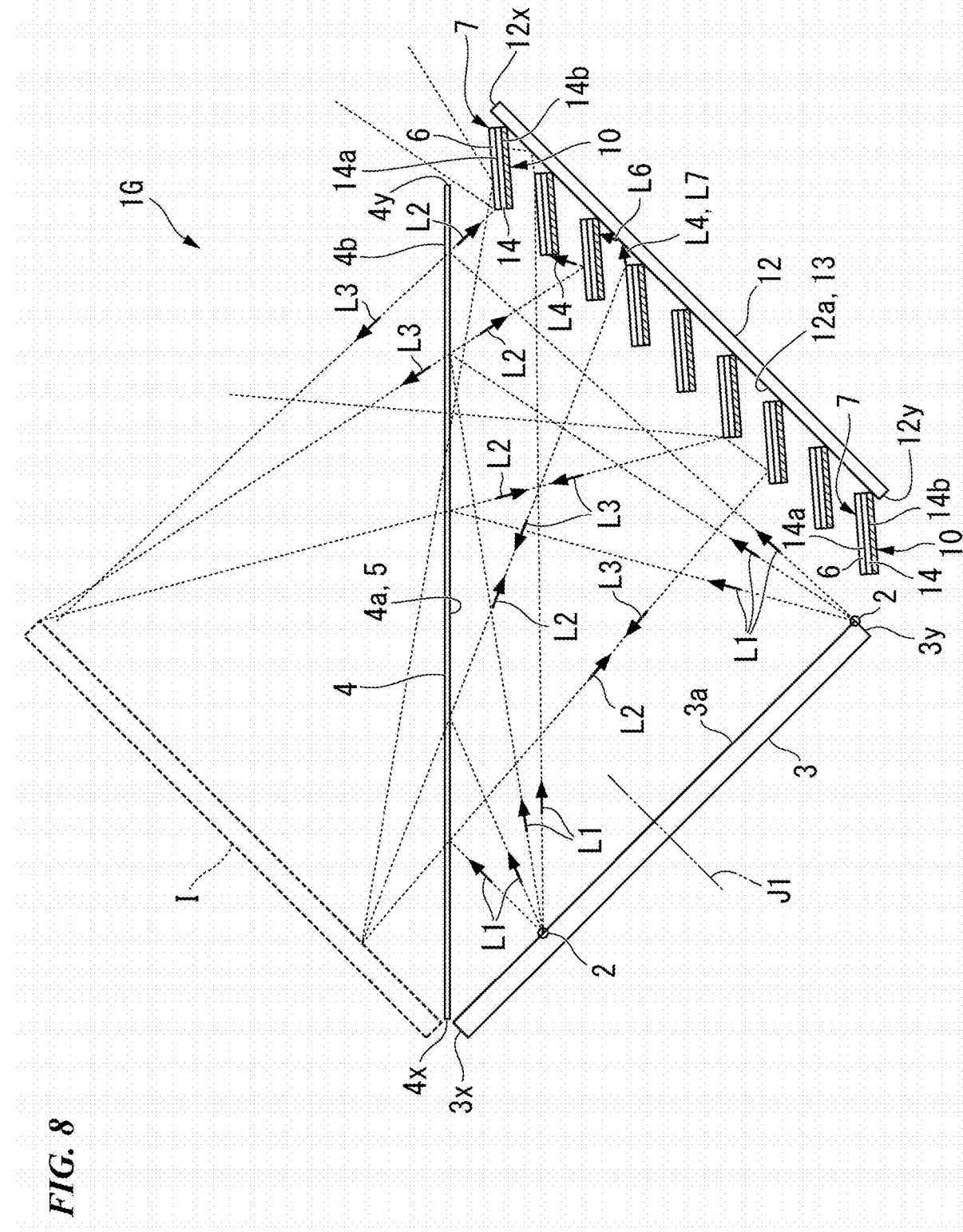
FIG. 8 is a side view showing a constitution of a display device according to a fourth embodiment of the present invention.

As shown in FIG. 8, the display device 1G includes the same elements as those of the display device 1A and further includes a retro-reflection portion (a second retro-reflection portion) 12 which further retro-reflects at least some of the retro-reflected light L3 and returns it to the retro-reflection portion 6.

In the display device 1G of the fourth embodiment, the retro-reflection portion 12 is formed in a plate shape and has a retro-reflection surface 13 on at least one plate surface 12a. The retro-reflection portion 12 be spaced apart from a perpendicular axis to the light splitting surface 5 between the display portion 3 and the retro-reflection portion 12 on the side opposite to the side of the display portion 3 so that a separation distance between the retro-reflection portion 12 and the perpendicular axis decreases at a constant ratio, as moving away from the light splitting portion 4 along the perpendicular axis.

The retro-reflection portion 12 is disposed to straddle the end 3y of the display portion 3 on the side opposite to the side of the light splitting portion 4 and the end 4y of the light splitting portion 4 on the opposite side to the end 4x connected to the display portion 3. An end 12x of the retro-reflection portion 12 is disposed in the vicinity of the end 4y of the light splitting portion 4.

On the other hand, an end 12y of the retro-reflection portion 12 is disposed in the vicinity of the end 3y of the display portion 3. That is, the plate surface of each of the display portion 3, the light splitting portion 4 and the retro-reflection portion 12 forms three sides of a substantially triangular shape.

Like the retro-reflection portion 6, a known retro-reflection sheet, a retro-reflection structure or one having the retro-reflection structure can be used as the retro-reflection portion 12, but it is not particularly limited.

In the display device 1G of the fourth embodiment, a plurality of protruding portions 14 which protrude from the retro-reflection surface 7 to the side of the display portion 3 (that is, the light source side) in a direction parallel to the light splitting surface 5 are disposed along the retro-reflection surface 7 at predetermined intervals. It is preferable that a distance between base ends of the plurality of protruding portions 14 on the retro-reflection surface 7 be smaller than a protruding dimension of the retro-reflection portion 6 from the retro-reflection surface 13.

That is, it is preferable that each of the retro-reflection portions 6 is disposed to have an overlap equal to or greater than a distance between the adjacent retro-reflection portions 6.

The retro-reflection portion 6 is provided on a surface 14a of the protruding portion 14 on the side of the light splitting portion 4. The retro-reflection surface 7 of the retro-reflection portion 6 faces the light splitting surface 5 side of the light splitting portion 4.

The first light blocking portion 8 is provided on the surface 14b of the protruding portion 14 on the side opposite to the side of the light splitting portion 4.

As long as the protruding portion 14 can be omitted and at least one of the retro-reflection portion 6 and the first light blocking portion 8 has such a suitable strength that the plate surface can be held as shown in FIG. 8, the retro-reflection portion 6 and the first light blocking portion 8 may be directly bonded to each other.

In the display device 1G of the fourth embodiment, as in the display device 1A of the first embodiment, the first reflected light L2 is incident on the retro-reflection portion 6 and is retro-reflected as the retro-reflected light L3 by the retro-reflection surface 7 in the same direction as the incident direction. The retro-reflected light L3 forms the aerial image I at a position symmetrical to the display portion 3 with respect to the light splitting surface 5.

On the other hand, in the display device 1G of the fourth embodiment, the surface-reflected light L4 surface-reflected by the retro-reflection surface 7 of the retro-reflection portion 6 is incident on the retro-reflection portion 12. Some of the surface-reflected light L4 again returns as further retro-reflected light L6 to the retro-reflection portion 6 by the retro-reflection surface 13 of the retro-reflection portion 12, and as a result contributes to the formation of the aerial image I. The remaining of the surface-reflected light L4 is surface-reflected as further surface-reflected light L7 by the retro-reflection surface 13 and is blocked by the first light blocking portion 8.

According to the above-described display device 1G of the fourth embodiment, as in the display device 1A of the first embodiment, the user can observe a bright aerial image I in a region in which an image could not be observed in a conventional display device in a space on the side opposite to the display portion 3 or the retro-reflection portion 6 with respect to the light splitting portion 4. Also, since the surface-reflected light L4 irradiated to the observation position of the aerial image I is blocked by the first light blocking portion 8, it is possible to prevent the surface-reflected light L4 or the false image from being observed by the user.

Fifth Embodiment

Next, a display device 1H according to a fifth embodiment of the present invention will be described. In the elements of the display device 1H of the fifth embodiment shown in FIG. 9, the same elements as those of the display device 1A of the first embodiment shown in FIG. 1 and so on are designated by the same reference numerals, and description thereof will be omitted.

Figure 9:
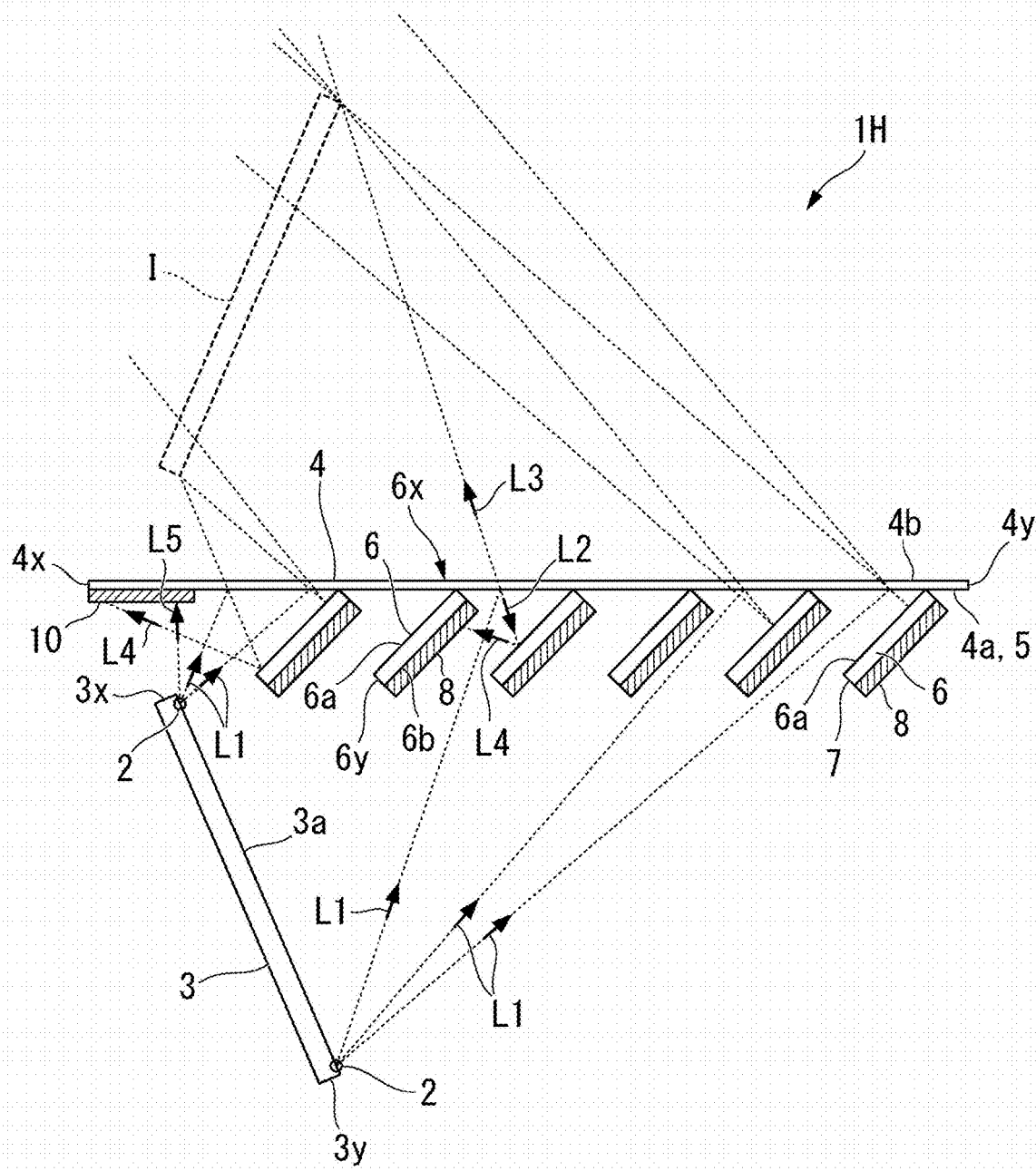
FIG. 9 is a side view showing a constitution of a display device according to a fifth embodiment of the present invention.

As shown in FIG. 9, the display device 1H includes the same elements as those of the display device 1A.

In the display device 1H, a plurality of the retro-reflection portions 6 are disposed along the light splitting surface 5 at a predetermined interval therebetween. The end 6x of the retro-reflection portion 6 on the side of the light splitting portion is disposed on the light splitting surface 5. On the other hand, the end 6y of the retro-reflection portion 6 on the side opposite to the side of the light splitting portion is disposed at substantially the same position as the end 3x of the display portion 3 on the side of the light splitting portion 4 in the direction perpendicular to the light splitting surface 5. Further, the end 6y of the retro-reflection portion 6 is disposed closer to the side of the display portion 3 than the end 6x of each of the retro-reflection portions 6 in a direction parallel to the light splitting surface 5. That is, the plurality of retro-reflection portions 6 are disposed to be inclined from the end 6x on the light splitting surface 5 toward the side of the display portion 3 and to direct the retro-reflection surface 7 toward the light splitting surface 5.

The first light blocking portion 8 is provided on the other plate surface 6b of the retro-reflection portion 6, that is, on the plate surface on the side opposite to the retro-reflection surface 7.

Further, in the display device 1H, the second light blocking portion 10 is disposed at a position in which it can block the surface-reflected light L4 from the retro-reflection portion 6 disposed closest to the side of the end 4x of the light splitting portion 4 in the direction parallel to the light splitting surface 5. Also, the second light blocking portion 10 is provided to be in contact with the light splitting surface 5.

In the display device 1H of the fifth embodiment, as in the display device 1A of the first embodiment, and so on, the first reflected light L2 is incident on the retro-reflection portion 6 and is retro-reflected as the retro-reflected light L3 in the same direction as the incident direction by the retro-reflection surface 7. The retro-reflected light L3 forms the aerial image I at a position symmetrical to the display portion 3 with respect to the light splitting surface 5. On the other hand, the surface-reflected light L4 which is surface-reflected by the retro-reflection surface 7 of the retro-reflection portion 6 other than the retro-reflection portion 6 disposed closest to the end 4x of the light splitting portion 4 is blocked by the first light blocking portion 8 facing the retro-reflection surface 7.

According to the above-described display device 1H of the fifth embodiment, the same operational effects as those of the display device 1G of the fourth embodiment can be obtained. Further, according to the display device 1H of the fifth embodiment, it is possible to block a direct image (not shown) of the display portion 3 by disposing the second light blocking portion 10 so that the user cannot see the direct image.

Figure 10:
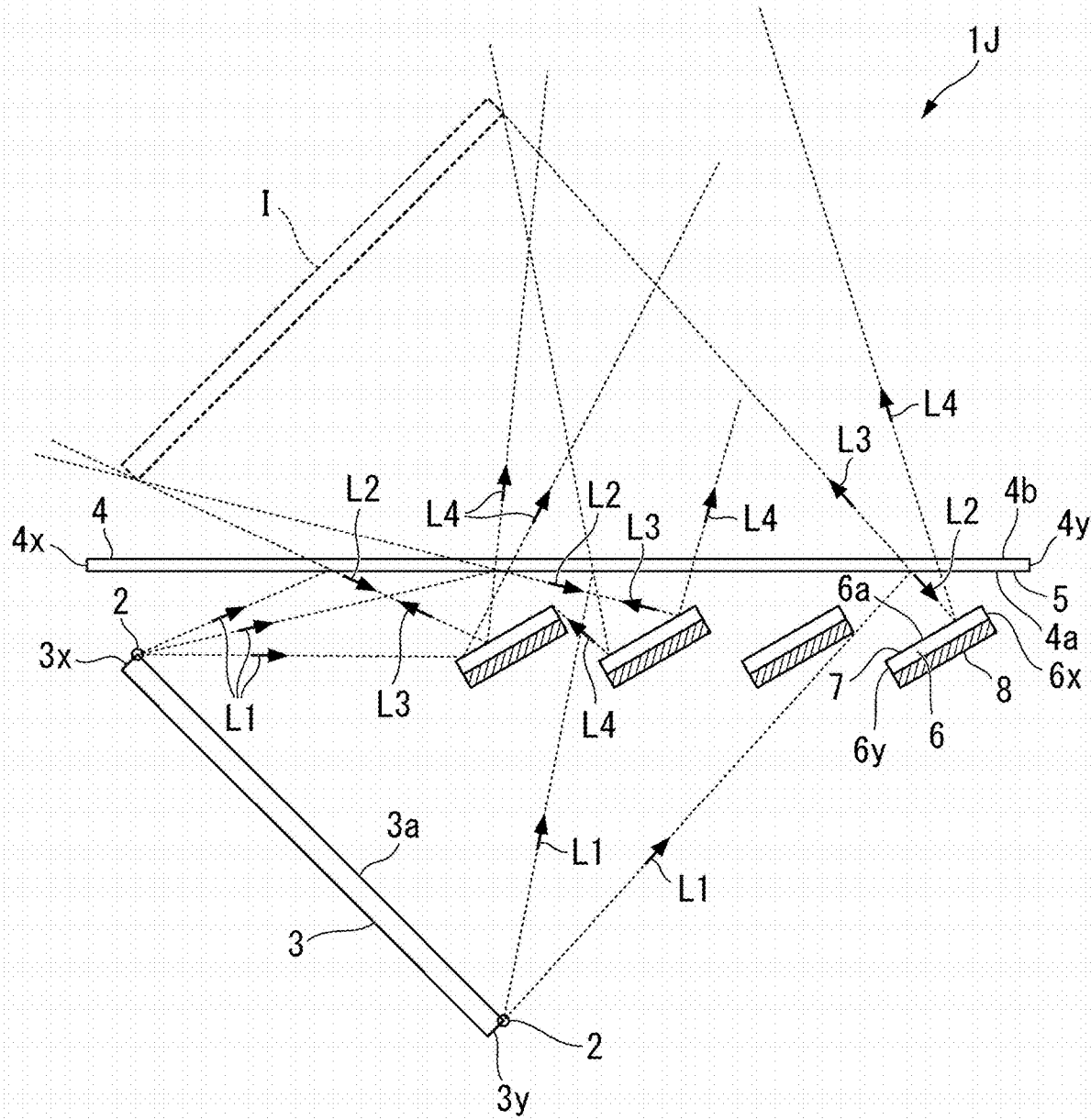
FIG. 10 is a side view showing a constitution of a modified example of the display device according to the fifth embodiment of the present invention.

A display device 1J shown in FIG. 10 is a modified example of the display device 1H.

As shown in FIG. 10, the retro-reflection portion 6 may be spaced apart from the light splitting surface 5 toward the display portion 3 as long as the retro-reflection portion 6 is inclined to direct the retro-reflection surface 7 toward the light splitting surface 5. Further, a traveling direction or an amount of the retro-reflected light L3 and the surface-reflected light L4 irradiated toward the observation position of the aerial image I is adjusted by adjusting an inclination angle of the retro-reflection portion 6, thereby it is possible to change a size or a formation position of the aerial image I.

According to the above-described display device 1J, the same operational effects as those of the display device 1H of the fifth embodiment can be obtained.

Sixth Embodiment

Next, a display device 1K according to a sixth embodiment of the present invention will be described. In the elements of the display device 1K of the sixth embodiment shown in FIG. 11, the same elements as those of the display device 1A of the first embodiment shown in FIG. 1 and so on are designated by the same reference numerals, and description thereof will be omitted.

Figure 11:
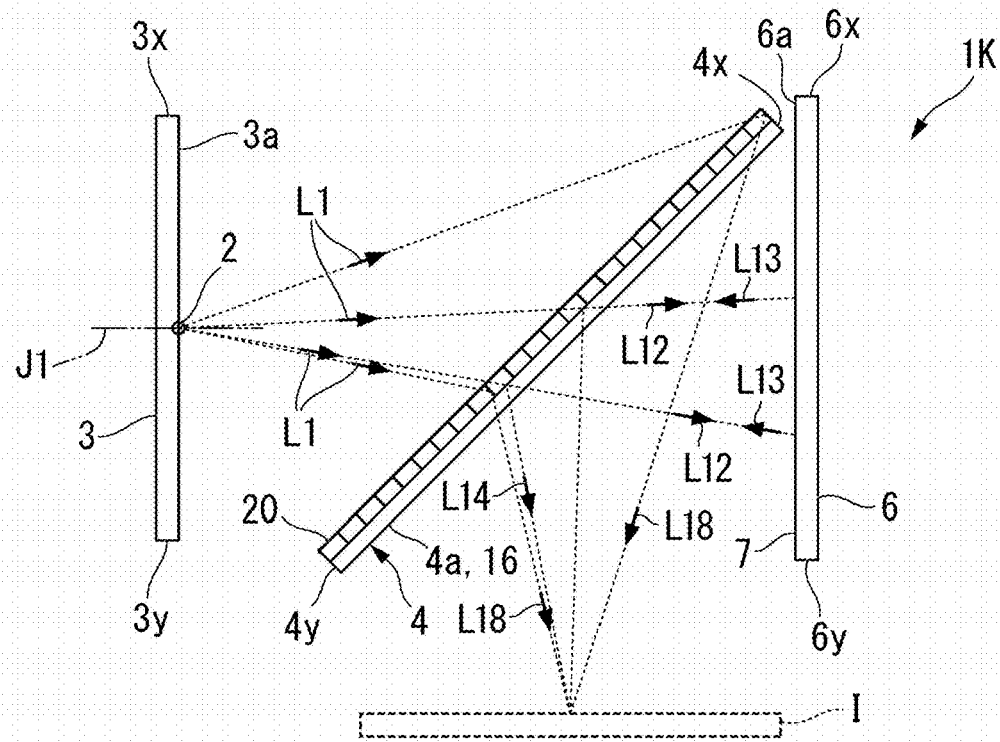
FIG. 11 is a side view showing a constitution of a display device according to a sixth embodiment of the present invention.

As shown in FIG. 11, the display device 1K of the sixth embodiment includes the display portion 3 including the light source 2, the light splitting portion 4, the retro-reflection portion (the first retro-reflection portion) 6, and an imaging portion 20.

The light splitting portion 4 is disposed on a first emission axis J1 which indicates an emission direction of the first emission light L1 emitted from the light source 2 of the display portion 3 and transmits at least some of the first emission light L1 as first transmitted light. A light splitting surface 16 is provided on one plate surface 4a of the light splitting portion 4. The light splitting surface 16 transmits some of the first emission light L1 emitted from the light source 2 as the first transmitted light L12 and surface-reflects at least some of the retro-reflected light L13 retro-reflected by the retro-reflection portion 6.

The light splitting surface 16 is disposed so that a separation distance between the light splitting surface 16 and the plate surface 3a of the display portion 3 decreases from the end 3x to the end 3y of the display portion 3. The separation distance between the light splitting surface 16 and the display portion 3 decreases from the end 4x of the light splitting portion 4 toward the end 4y thereof in a direction perpendicular to the light splitting surface 16. That is, the light splitting surface 16 is disposed to be inclined at a predetermined angle with respect to the plate surface 3a of the display portion 3.

The retro-reflection surface 7 of the retro-reflection portion 6 retro-reflects at least some of the first transmitted light L12 transmitted through the light splitting portion 4 as retro-reflected light L13. The retro-reflection portion 6 is disposed on the first emission axis J1 with the light splitting portion 4 interposed therebetween. The retro-reflection surface 7 faces the side of the plate surface 3a of the display portion 3. That is, the retro-reflection portion 6 faces the display portion 3.

The imaging portion 20 is formed in a plate shape and is disposed on the side of the retro-reflection portion 6 of the light splitting portion 4 along the plate surface 4a of the light splitting portion 4. The imaging portion 20 surface-reflects and images the retro-reflected light L13.

The imaging portion 20 may be, for example, a crossed mirror array (CMA), an aerial imaging (AI) plate, a dihedral corner reflector array (DCRA), a transparent cube array, a double-layered arrays of rectangular mirrors (WARM), or the like.

In the display device 1K of the sixth embodiment, the first emission light L1 is transmitted through the imaging portion 20 and the light splitting portion 4 and is incident on the retro-reflection portion 6 as the first transmitted light L12. The first transmitted light L12 is retro-reflected as the retro-reflected light L13 by the retro-reflection surface 7 in the same optical path as the incident direction in a direction opposite to the incident direction. Some of the retro-reflected light L13 is surface-reflected by the light splitting surface 16 and forms the aerial image I as surface-reflected light L14. The retro-reflected light L13 which has been transmitted through the light splitting portion 4 is surface-reflected as surface-reflected light L18 by the imaging portion 20 and been focused, and forms an image to form the aerial image I. The formation position of the aerial image I is symmetrical with a position of the light source 2 with a direction of the plate surface 4a of the light splitting portion 4 as a center.

According to the above-described display device 1K of the sixth embodiment, the user can observe a bright aerial image I in a space on the side opposite to the display portion 3 with the plate surface 4a of the light splitting portion 4 as a center (that is, a base axis). In addition, since the surface-reflected light (not shown) due to the retro-reflection surface 7 of the retro-reflection portion 6 is diffused and no reduced image is basically formed, it is possible to prevent the false image or the like from being observed by the user.

Seventh Embodiment

Next, a display device 1M according to a seventh embodiment of the present invention will be described. In the elements of the display device 1M of the seventh embodiment shown in FIG. 12, the same elements as those of the display device 1A of the first embodiment shown in FIG. 1 and so on are designated by the same reference numerals, and description thereof will be omitted.

Figure 12:
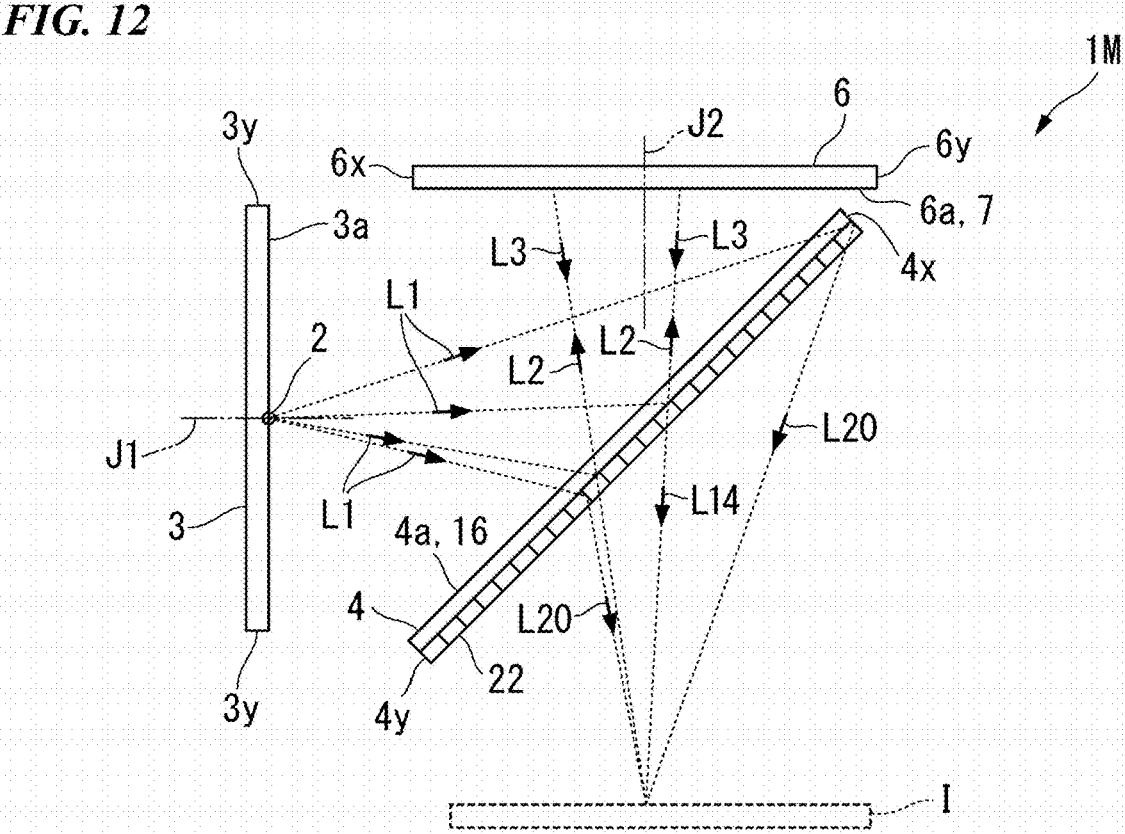
FIG. 12 is a side view showing a constitution of a display device according to a seventh embodiment of the present invention.

As shown in FIG. 12, the display device 1M of the seventh embodiment includes the display portion 3 including the light source 2, the light splitting portion 4, the retro-reflection portion (the first retro-reflection portion) 6, and an imaging portion 22.

The light splitting portion 4 is disposed on the first emission axis J1 of the first emission light L1 emitted from the light source 2 of the display portion 3 and surface-reflects at least some of the first emission light L1 as the first reflected light L2. The light splitting surface 16 is provided on one plate surface 4a of the light splitting portion 4. The light splitting surface 16 surface-reflects some of the first emission light L1 as the first reflected light L2 and transmits the retro-reflected light L3 retro-reflected by the retro-reflection portion 6.

The light splitting surface 16 faces the plate surface 3a of the display portion 3. The light splitting surface 16 is disposed so that a separation distance between the light splitting surface 16 and the plate surface 3a of the display portion 3 decreases from the end 3x to the end 3y of the display portion 3. The separation distance from the display portion 3 decreases from the end 4x of the light splitting portion 4 to the end 4y thereof in the direction perpendicular to the light splitting surface 16. That is, the light splitting surface 16 is disposed to be inclined at a predetermined angle with respect to the plate surface 3a of the display portion 3.

The retro-reflection surface 7 of the retro-reflection portion 6 retro-reflects at least some of the first reflected light L2 surface-reflected by the light splitting surface 16 as the retro-reflected light L3. The retro-reflection portion 6 is disposed on a second emission axis J2 which indicates a traveling direction of the first reflected light L2. The retro-reflection surface 7 faces the light splitting surface 16 of the light splitting portion 4. Further, in a direction parallel to a second emission axis J2 (that is, a direction perpendicular to the retro-reflection surface 7), the light splitting surface 16 is disposed so that a separation distance between the light splitting surface 16 and the plate surface 4a of the light splitting portion 4 increases from the end 4x of the light splitting portion 4 to the end 4y thereof. The retro-reflection surface 7 is disposed to face the plate surface 3a of the display portion 3 through reflection in the light splitting portion 4.

The imaging portion 20 is formed in a plate shape and is disposed on the side of the retro-reflection portion 6 of the light splitting portion 4 along the plate surface 4a of the light splitting portion 4. The imaging portion 20 transmits the retro-reflected light L3 and images the first emission light L1.

The imaging portion 20 may be, for example, a crossed mirror array (CMA), an aerial imaging (AI) plate, a dihedral corner reflector array (DCRA), a transparent cube array, a double-layered arrays of rectangular mirrors (WARM), or the like.

In the display device 1M according to the seventh embodiment, the first emission light L1 is surface-reflected by the light splitting surface 16 and is incident on the retro-reflection portion 6 as the first reflected light L2. The first reflected light L2 is retro-reflected as the retro-reflected light L3 by the retro-reflection surface 7 in the same optical path as the incident direction in the direction opposite to the incident direction. Some of the retro-reflected light L3 is transmitted through the light splitting portion 4 and the imaging portion 22 and forms the aerial image I. On the other hand, the first emission light L1 which was transmitted through the light splitting portion 4 is surface-reflected by the imaging portion 20 as surface-reflected light L20 and focused, and forms an image to form the aerial image I. The formation position of the aerial image I is symmetrical with the position of the light source 2 with a direction of the plate surface 4a of the light splitting portion 4 as a center.

According to the above-described display device 1M of the seventh embodiment, as in the display device 1K of the sixth embodiment, the user can observe a bright aerial image I in a space on the side opposite to the display portion 3 with the plate surface 4a of the light splitting portion 4 as a center (that is, a base axis). Further, since the surface-reflected light (not shown) due to the retro-reflection surface 7 of the retro-reflection portion 6 is diffused and no reduced image is basically formed, it is possible to prevent the false image or the like from being observed by the user.

According to the above-described display device of each of the embodiments, it is possible to attract user's attention only to the aerial image I by forming the bright aerial image I and preventing the observation of the false image or the like. Also, since the user does not directly see the display portion 3 having the light source 2, it is possible to use the light source 2 having super brightness.

Further, a display method to which the present invention is applied includes a step of emitting the first emission light L1 from the light source 2 and reflecting at least some of the first emission light L1 at a position on the first emission axis J1 as the first reflected light L2 toward the retro-reflection portion 6 by the light splitting portion 4, a step of retro-reflecting at least some of the first reflected light L2 at a position on the second emission axis J2 as the retro-reflected light L3 toward the light splitting portion 4 by the retro-reflection portion 6, a step of transmitting at least some of the retro-reflected light L3 at the light splitting portion 4, and a step of blocking the surface-reflected light L4 reflected by the retro-reflection portion 6 to the observation position of the retro-reflected light L3 by the first light blocking portion 8.

The display method to which the present invention is applied may further include a step of blocking the direct irradiation light L5 directly irradiated to the observation position of the retro-reflected light L3 from the light source 2 by the second light blocking portion 10 and may include the step of blocking the direct irradiation light L5 by the second light blocking portion 10 instead of the step of blocking the surface-reflected light L4 by the first light blocking portion 8.

According to the display method described above, it is possible to prevent the false image or the surface-reflected light L4 from being observed by the user.

Although the preferred embodiments of the present invention have been described in detail above, the present invention is not limited to the specific embodiments, and various modifications and changes are possible within the scope of the gist of the present invention described in the claims.

Figure 13:
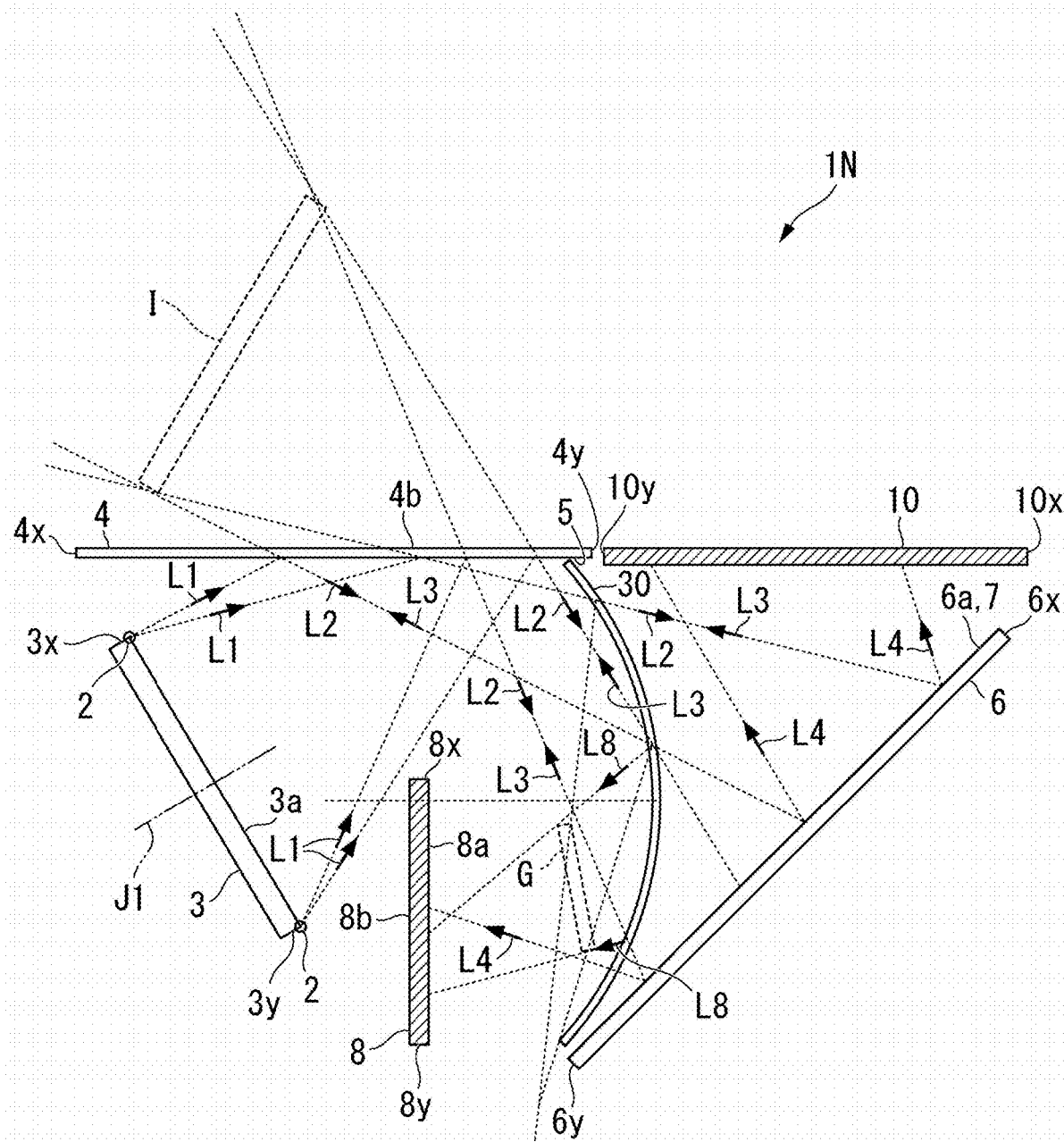
FIG. 13 is a side view showing a constitution of a modified example of the display device according to the present invention.

For example, as shown in FIG. 13, the display device according to the present invention may have a wavelength film 30. The display device 1N shown in FIG. 13 includes the display portion 3 (the light source 2), the light splitting portion 4, the retro-reflection portion 6, the first light blocking portion 8, and the second light blocking portion 10. Among the elements of the display device 1N, the elements which are common to the display device 1A of the first embodiment or the display device 1B of the second embodiment are designated by the same reference numerals, and a description thereof will be omitted.

As described above, the retro-reflection portion 6 is formed in a plate shape and can be bent, but the retro-reflection portion 6 is formed in a planar shape in the display device 1N. The retro-reflection surface 7 faces the light splitting surface 5 of the light splitting portion 4. Further, the retro-reflection portion 6 is inclined at a predetermined angle with respect to the light splitting portion 4 so that a separation distance between the end 6y and the end 4x of the light splitting portion 4 is larger than a separation distance between the end 6x and the end 4y of the light splitting portion 4.

The end 8x of the first light blocking portion 8 is located between the end 3x and the end 3y of the display portion 3 in a direction perpendicular to the light splitting surface 5.

In the same direction, the end 8y of the first light blocking portion 8 is separated from the light splitting portion 4 further than the end 3y of the display portion 3. The first light blocking portion 8 is disposed at a position which is configured to block all surface-reflected light from the wavelength film 30.

The second light blocking portion 10 is disposed to be flush with the light splitting portion 4. The end 10x of the second light blocking portion 10 is disposed in the vicinity of the end 6x of the retro-reflection portion 6. The end 10y of the second light blocking portion 10 is connected to the end 4y of the light splitting portion 4.

The wavelength film 30 is disposed between the retro-reflection portion 6 and the first light blocking portion 8 in a direction along the light splitting surface 5, extends from the vicinity of the end 4y of the light splitting portion 4 in a direction away from the light splitting surface 5 and is curved to be convex toward the retro-reflection portion 6. The wavelength film 30 is a ¼-wavelength plate which is formed in a plate shape and is bendable and transparent.

In the above-described display device 1N, polarization of the retro-reflected light L3 changes as it is transmitted through the wavelength film 30. Since a polarization plane of the retro-reflected light L3 after it passes through the wavelength film 30 is rotated by 90 degrees after reflection on the light splitting surface 5, the retro-reflected light L3 is incident on the light splitting surface 5 of the light splitting portion 4, is transmitted through the light splitting portion 4 and forms the aerial image I at a position symmetrical to the light source 2, that is, the display portion 3, with respect to the light splitting surface 5. On the other hand, an image G due to surface-reflected light L8 from the wavelength film 30 is formed in a space between the first light blocking portion 8 and the wavelength film 30 in the direction along the light splitting surface 5.

According to the display device 1N described above, as in the display device 1A of the first embodiment, it is possible to observe a bright aerial image I in a region in which an image could not be observed in a conventional display device. Further, as shown in FIG. 13, the surface-reflected light L4 is blocked by the first light blocking portion 8 and the second light blocking portion 10, and when the user looks at the aerial image I, the image G due to the surface-reflected light L8 and the reduced image of the mirror image with respect to the light splitting portion 4 of the display portion 3 are blocked by the first light blocking portion 8 and the second light blocking portion 10. Therefore, it is possible to prevent the false image from being observed by the user.

Figure 14:
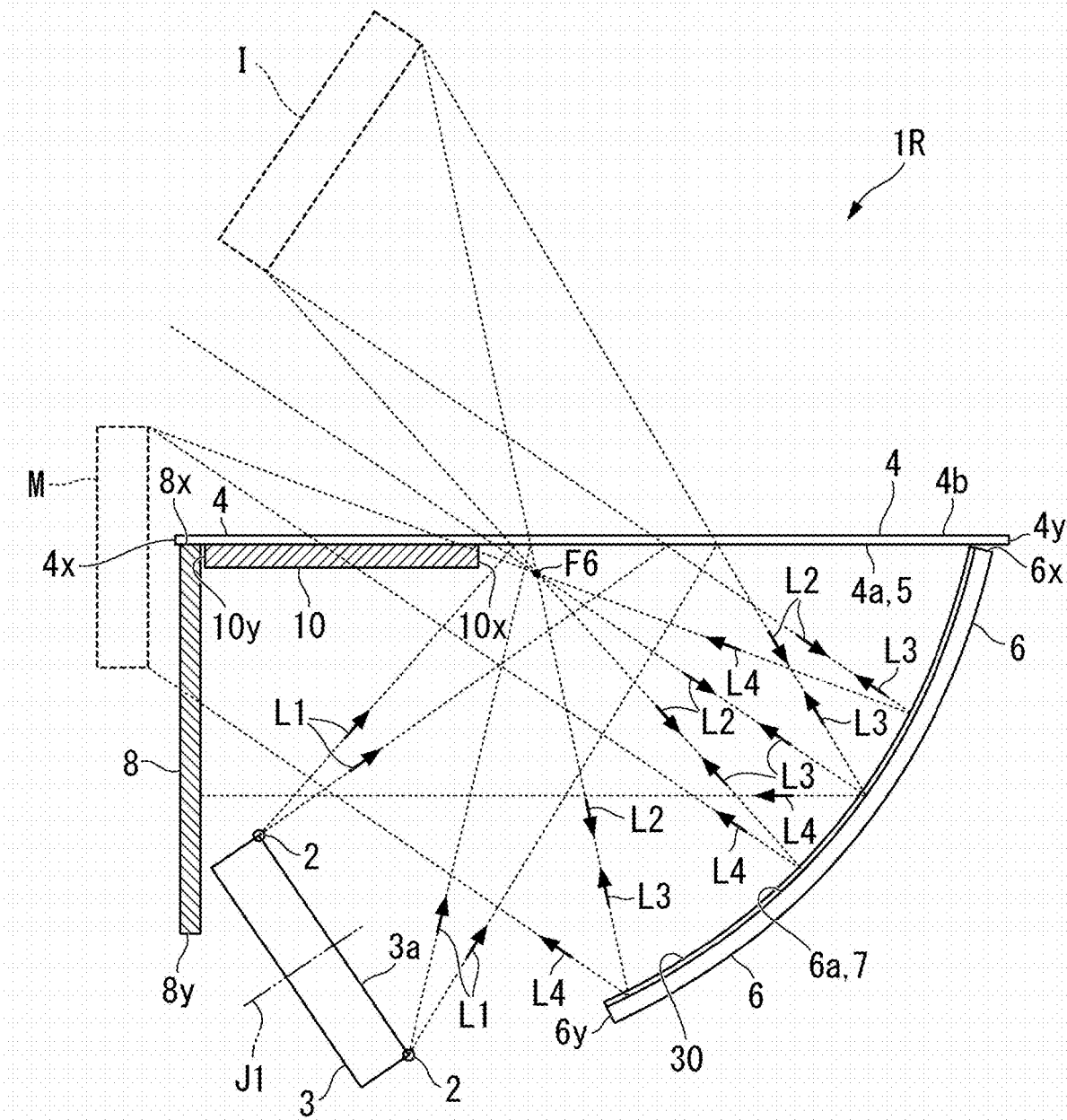
FIG. 14 is a side view showing a constitution of a modified example of the display device according to the present invention.

Further, as a modified example of the display device according to the present invention, there is a display device 1R shown in FIG. 14. Among elements of the display device 1R, the same elements as those of the display device 1B of the second embodiment are designated by the same reference numerals as those of the display device 1B, and description thereof will be omitted.

In the display device 1R, the second light blocking portion 10 is provided to be in contact with the same side as the display portion 3 (the light source) of the light splitting portion 4, that is, the light splitting surface 5. That is, the second light blocking portion 10 is disposed on the same side as the display portion 3 and the retro-reflection portion 6 with respect to the light splitting portion 4.

As in the constitution of the display device 1B of the second embodiment, the end 10x of the second light blocking portion 10 is located in the vicinity of an intersection position between some of the surface-reflected light L4 closest to the end 4y of the light splitting portion 4 and the other plate surface 4b of the light splitting portion 4. A position of the end 10y of the second light blocking portion 10 is not particularly limited, and the end 10y of the second light blocking portion 10 is connected to the end 8x of the first light blocking portion 8 from the viewpoint of minimizing a size of the second light blocking portion 10.

Further, the display device 1R may include the wavelength film 30. In this constitution, the wavelength film 30 is disposed to be in contact with the retro-reflection surface 7 of the retro-reflection portion 6.

According to the display device 1R, the same operational effects as those of the display device 1B of the second embodiment can be obtained. Further, according to the display device 1R, the direct irradiation light L5 irradiated to the observation position of the aerial image I is blocked by the second light blocking portion 10, and when the user looks at the aerial image I, a direct image (not shown) of the display portion 3 is blocked by the second light blocking portion 10. Therefore, it is possible to prevent the direct image of the display portion 3 in addition to the false image from being observed by the user. In addition, since the wavelength film 30 is provided, a phase difference can be imparted to the retro-reflected light L3, and the aerial image I can be formed.

Figure 15:
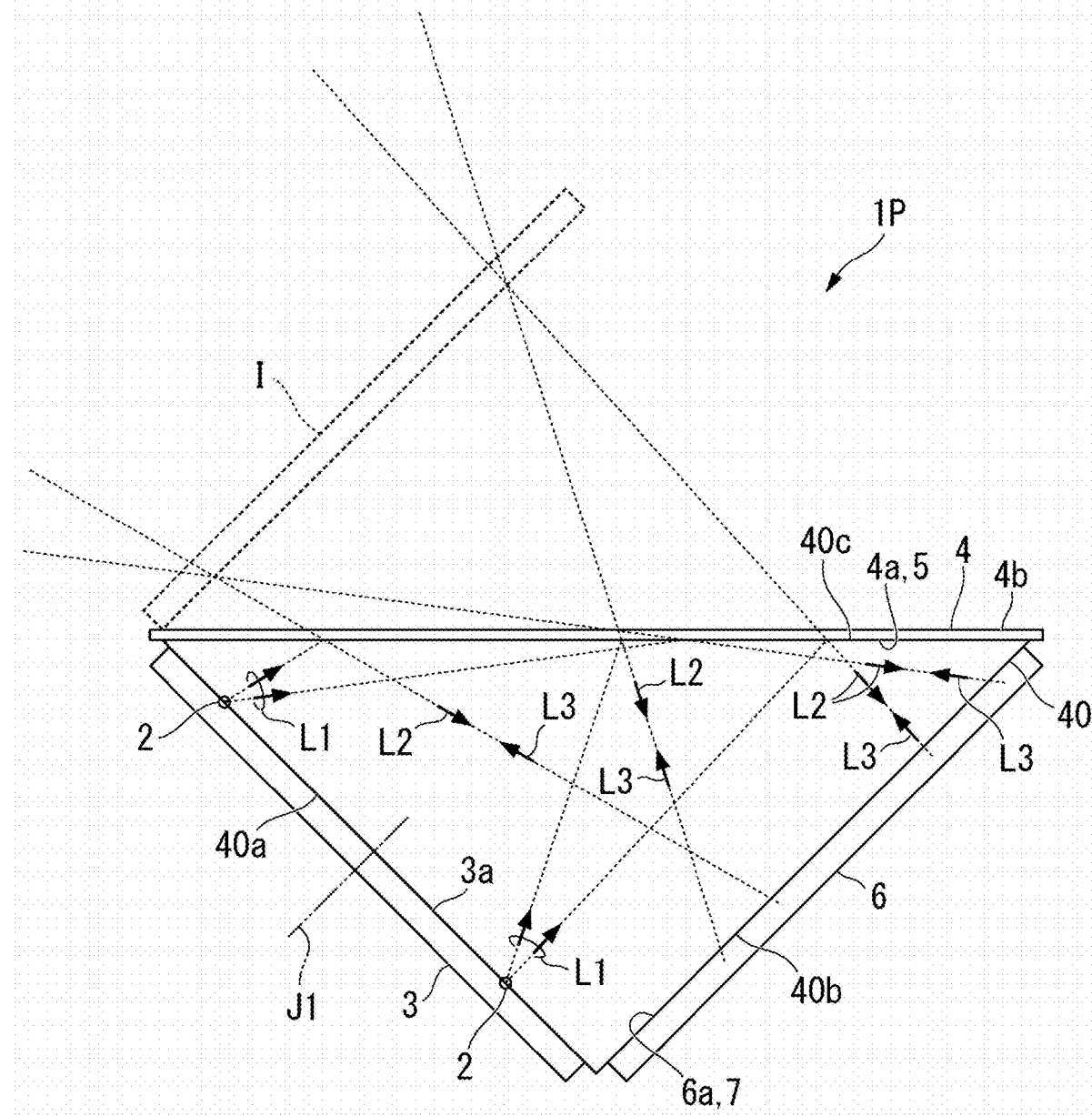
FIG. 15 is a side view showing a constitution of a modified example of the display device according to the present invention.

Further, as a modified example of the display device according to the present invention, there is a display device 1P shown in FIG. 15. The display device 1P includes a surface reflection suppressing portion 40. Among the elements of the display device 1P, the elements which are common to the display device 1G are designated by the same reference numerals, and a description thereof will be omitted.

The surface reflection suppressing portion 40 is disposed to fill a space surrounded by the display portion 3, the retro-reflection portion 6, and the light splitting portion 4. In the constitution shown in FIG. 15, the surface reflection suppressing portion 40 is formed to have an inverted triangular shape in a side view. An end surface 40a of the surface reflection suppressing portion 40 is in contact with the plate surface 3a of the display portion 3, an end surface 40b of the surface reflection suppressing portion 40 is in contact with the retro-reflection surface 7 of the retro-reflection portion 6, and an end surface 40c of the surface reflection suppressing portion 40 is in contact with the light splitting surface 5 of the light splitting portion 4. A refractive index of the surface reflection suppressing portion 40 is the same as a refractive index of the retro-reflection portion 6.

In the display device 1P, as in the display device 1A of the first embodiment, the first reflected light L2 is incident on the retro-reflection portion 6 and is retro-reflected as the retro-reflected light L3 by the retro-reflection surface 7 in the same direction as the incident direction. The retro-reflected light L3 forms the aerial image I at a position symmetrical to the display portion 3 with respect to the light splitting surface 5. Further, in the display device 1P, since there is no difference in the refractive index between the retro-reflection portion 6 and the surface reflection suppressing portion 40, the surface-reflected light at the retro-reflection portion 6 can be suppressed. Accordingly, it is not necessary to provide the first light blocking portion 8 and the second light blocking portion 10, the surface reflection suppressing portion 40 plays a role of the first light blocking portion 8 or the second light blocking portion 10, and the constitution of the display device 1P can be simplified more than that of the display device 1G of the fourth embodiment or the like.

Figure 16:
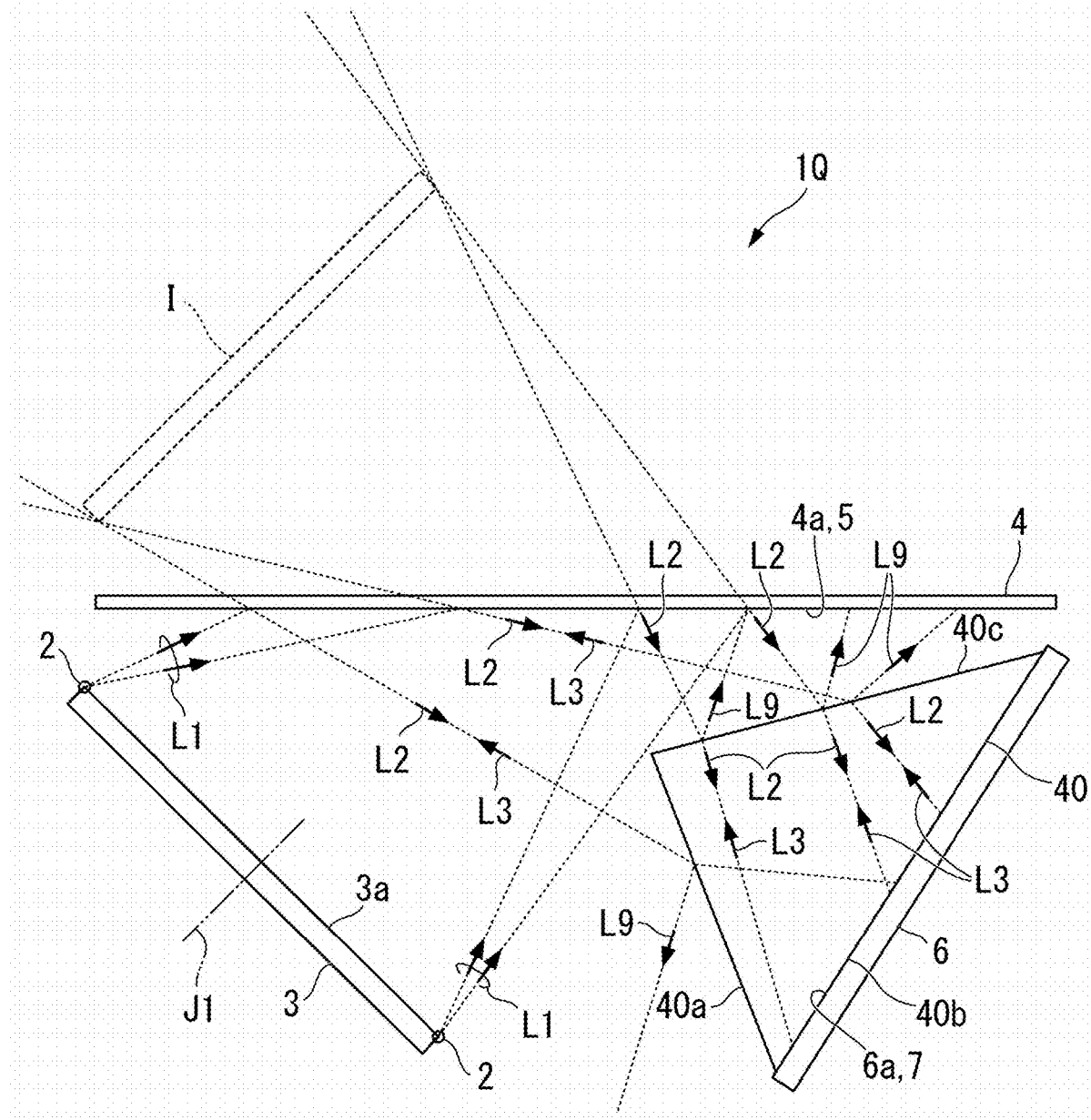
FIG. 16 is a side view showing a constitution of a modified example of the display device according to the present invention.

As described above, it is preferable that the surface reflection suppressing portion 40 be disposed to fill the space surrounded by the display portion 3, the retro-reflection portion 6, and the light splitting portion 4 from the viewpoint of suppressing the surface-reflected light at the end surfaces 40a and 40c, or the like, but the surface reflection suppressing portion 40 may be reduced as shown in FIG. 16 as long as the end surface 40b is in contact with the retro-reflection surface 7. In the display device 1Q shown in FIG. 16, the end surface 40a of the surface reflection suppressing portion 40 is separated from the plate surface 3a of the display portion 3, and the end surface 40b of the surface reflection suppressing portion 40 is separated from the light splitting surface 5 of the light splitting portion 4. In the display device 1Q, the first reflected light L2 is refracted by the end surfaces 40a and 40b of the surface reflection suppressing portion 40, travels toward the retro-reflection surface 7, is surface-reflected at each of the end surfaces 40a and 40b and becomes surface-reflected light L9. The end surfaces 40a and 40b of the surface reflection suppressing portion 40 are disposed so that the surface-reflected light L9 travels in a direction different from a traveling direction of the retro-reflected light L3 forming the aerial image I. According to the display device 1Q, the same effects as those of the display device 1P can be obtained, and manufacturing cost of the display device 1Q can be minimized by downsizing the surface reflection suppressing portion 40.

Figure 17:
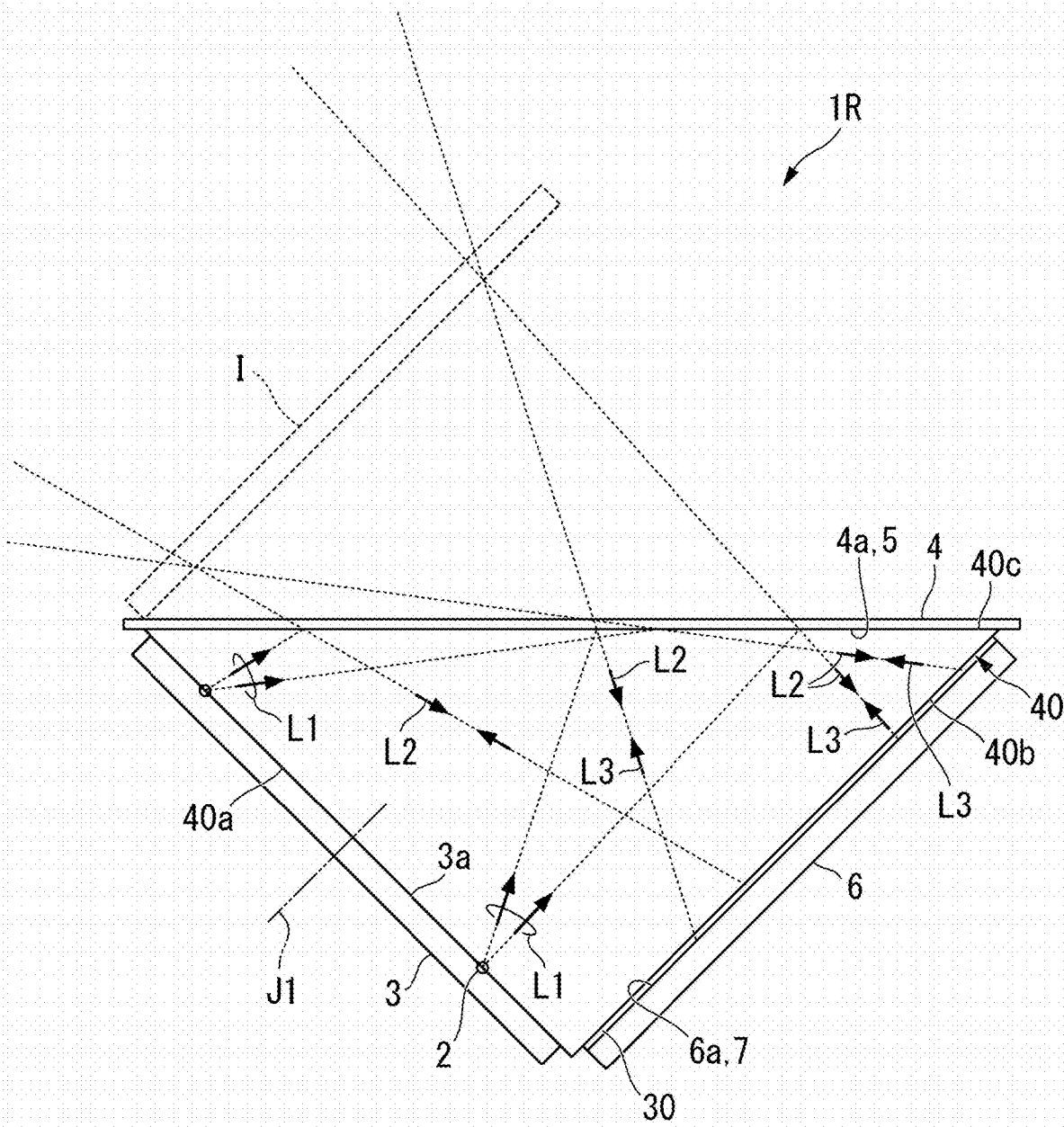
FIG. 17 is a side view showing a constitution of a modified example of the display device according to the present invention.
Figure 18:
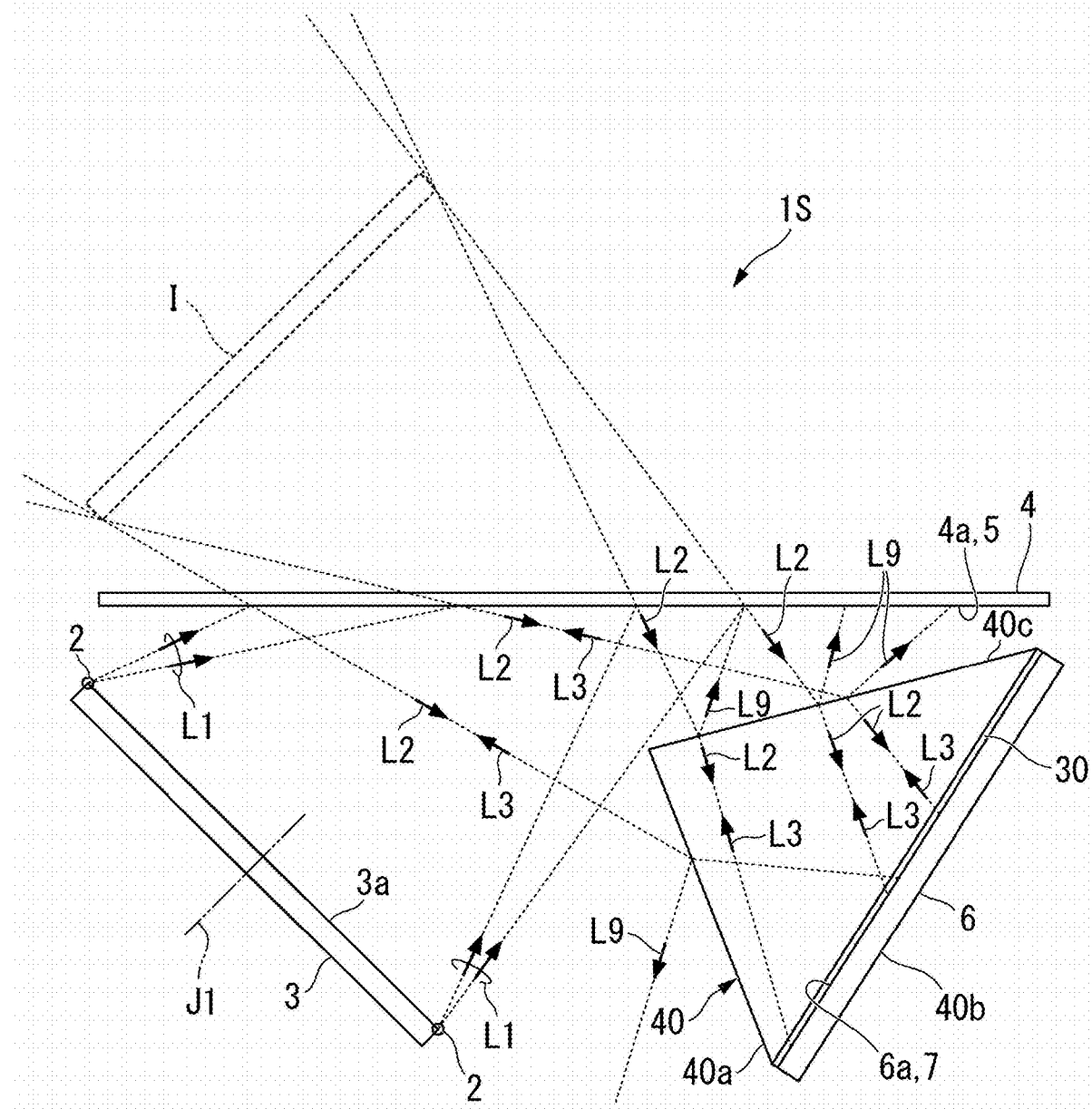
FIG. 18 is a side view showing a constitution of a modified example of the display device according to the present invention.

The above-described display device 1P and display device 1Q, as shown in FIGS. 17 and 18, the wavelength film 30 may be provided between the retro-reflection surface 7 of the retro-reflection portion 6 and the end surface 40b of the surface reflection suppressing portion 40. According to the display devices 1R and 1S shown in FIGS. 17 and 18, as described in the display device 1N, it is possible to form the aerial image I by imparting a phase difference to the retro-reflected light L3.

Figure 19:
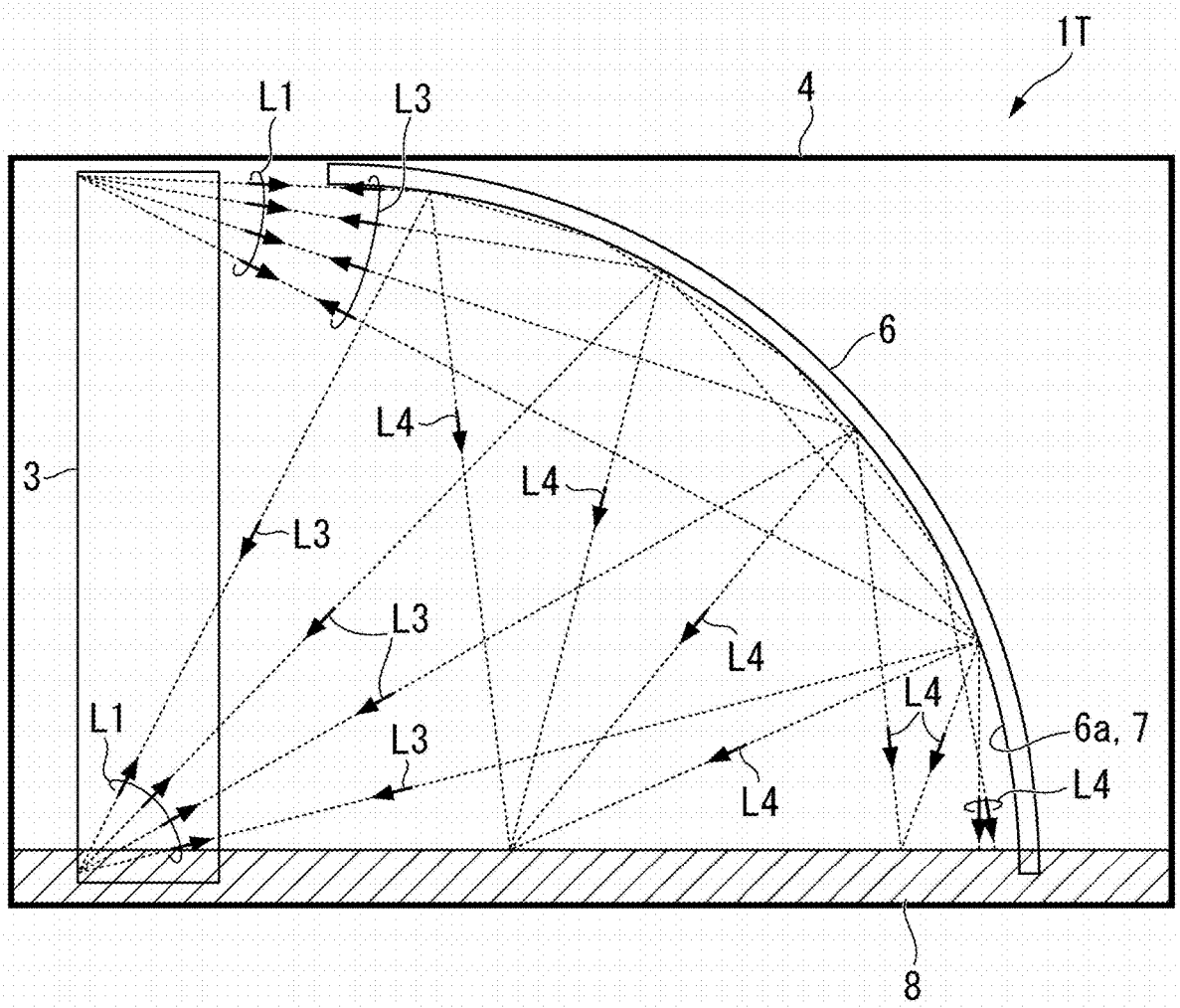
FIG. 19 is a top view showing a constitution of a modified example of the display device according to the present invention.

As another modified example of the display device according to the present invention, there is a display device IT shown in FIG. 19. Among the elements of the display device 1T, the elements which are common to the display device 1A of the first embodiment are designated by the same reference numerals as those of these display devices, and description thereof will be omitted.

In the display device 1T, the display portion 3 is located below the light splitting portion 4 in a side view, and the aerial image (not shown) is formed at the same position as the display portion 3 in a top view and above the light splitting portion 4 in a side view.

Figure 20:
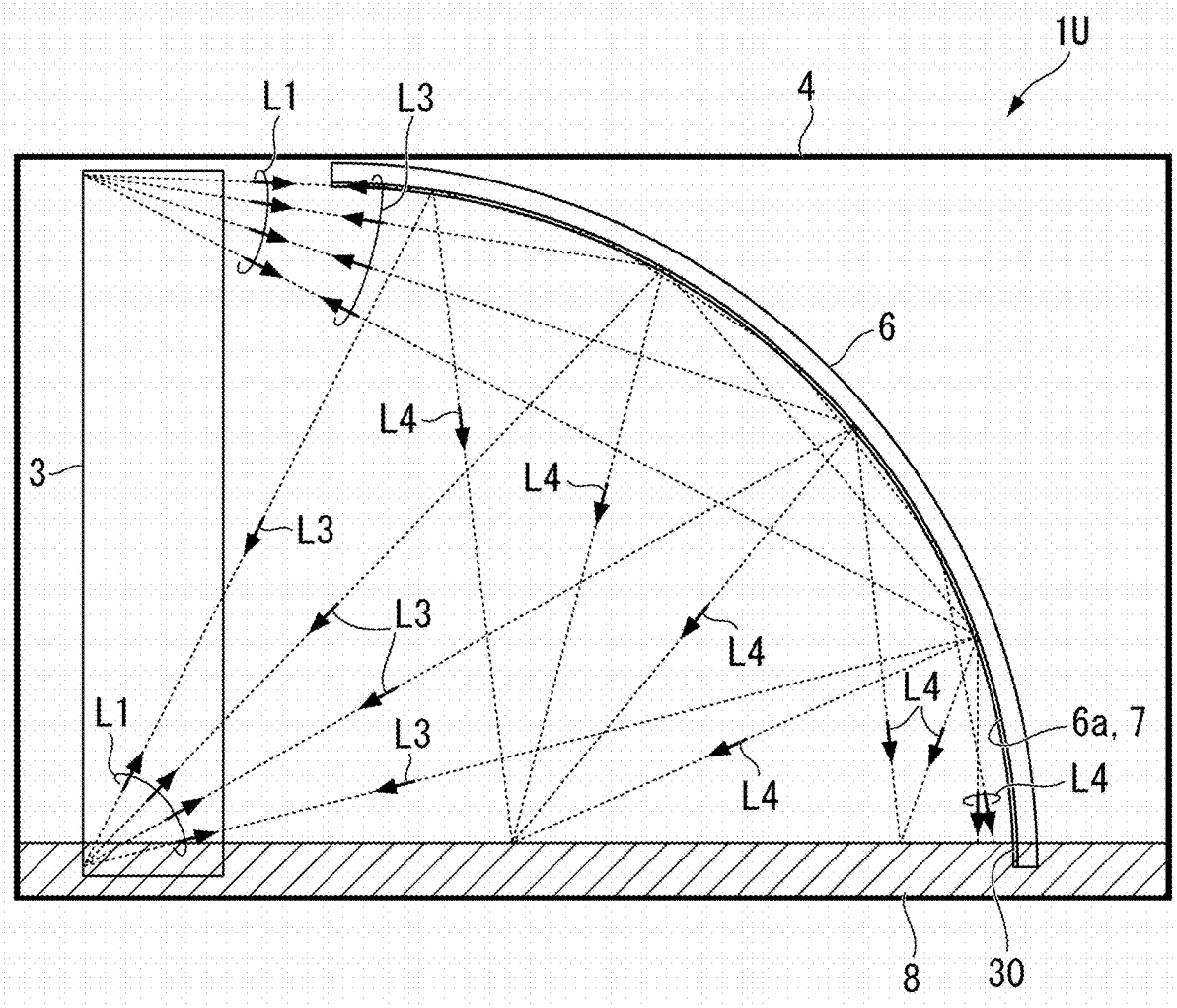
FIG. 20 is a top view showing a constitution of a modified example of the display device shown in FIG. 19.

Further, as shown in FIG. 20, the display device IT may be a display device 1U including the wavelength film 30. In this constitution, the wavelength film 30 is disposed to be in contact with the retro-reflection surface 7 of the retro-reflection portion 6. In the display device 1U, the same operational effects as those of the display device 1R shown in FIG. 14 or the like can be obtained. In the display device including this constitution, the retro-reflection portion 6 may be bent in a vertical direction or a right and left direction of the device to function like a concave mirror.

EXAMPLES

Next, examples conducted to confirm the effect of the display device according to each of the embodiments of the present invention will be described. The present invention is not limited to the following examples.

Example 1

To construct the display device 1A shown in FIG. 1, an LED which emits visible light was used as the light source 2. Also, a special display in which a plurality of light sources 2 are arranged on the plate surface 3a of the display portion 3 was prepared. A half mirror was used for the light splitting portion 4. In the retro-reflection portion 6, a retro-reflection sheet (product name: J701, manufacturer: Reflexite Corporation) having a unit structure size of about 180 μm and formed of transparent plastic was used. As the first light blocking portion 8, a black polypropylene plate was used.

Figure 21:
FIG. 21 is a photograph of an aerial image observed in Example 1.

In the constructed display device 1A, when the character "AIRR" was displayed on the display portion 3, it was confirmed that the aerial image I of the character "AIRR" is observed as shown in FIG. 21. In addition, no components due to the surface-reflected light, the reduced images, and so on were observed.

Comparative Example 1

The display device shown in FIG. 1 was constructed in the same manner as in Example 1 except that the first light blocking portion 8 was not provided. That is, the first light blocking portion 8 was omitted in the display device 1A.

Figure 22:
FIG. 22 is a photograph of an aerial image observed in Comparative example 1.

In the display device of the comparative example, when the character "AIRR" was displayed on the display portion 3, it was confirmed that a surface reflection component is observed together with the aerial image I of the character "AIRR" as shown in FIG. 22.

As can be understood from the above-described example and comparative example, according to the display device to which the present invention is applied, it is possible to obtain the favorable aerial image I and to prevent the surface-reflected light, the reduced image, and the false image from being observed. Thus, it is possible to improve visibility of the user to the aerial image I.

Example 2

Next, the display device 1C shown in FIG. 4 was constructed. A smartphone (model number: XPERIA SO-01G, manufacturer: SONY) was used for the display portion 3 with the light source 2. A retro-reflection sheet (product name: Nikkalite CRG, manufacturer: Nippon Carbide Industries Co., Ltd.) was used for the retro-reflection portion 6. A commercially available acrylic plate was used for the light splitting portion 4, and a black plastic corrugated cardboard formed of polypropylene was used for the first light blocking portion 8.

Figure 23:
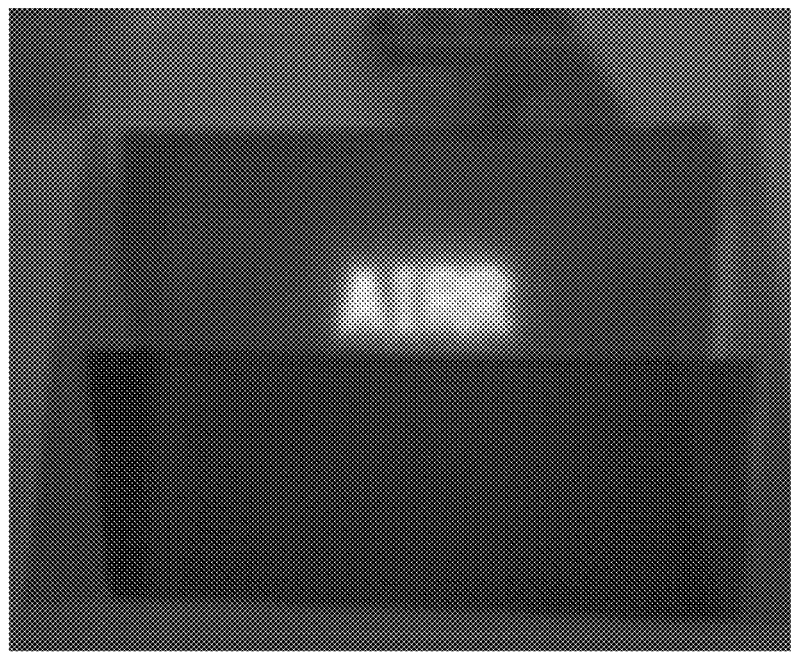
FIG. 23 is a photograph of an aerial image observed in Example 2.

In the constructed display device 1C, when the character "AIRR" was displayed on the display portion 3, it was confirmed that the aerial image I of the character "AIRR" is observed as shown in FIG. 23. In addition, no components due to the surface-reflected light, the reduced images, and so on were observed.

Comparative Example 2

The display device shown in FIG. 4 was constructed in the same manner as in Example 1 except that the first light blocking portion 8 was not provided. That is, the first light blocking portion 8 was omitted in the display device 1C.

Figure 24:
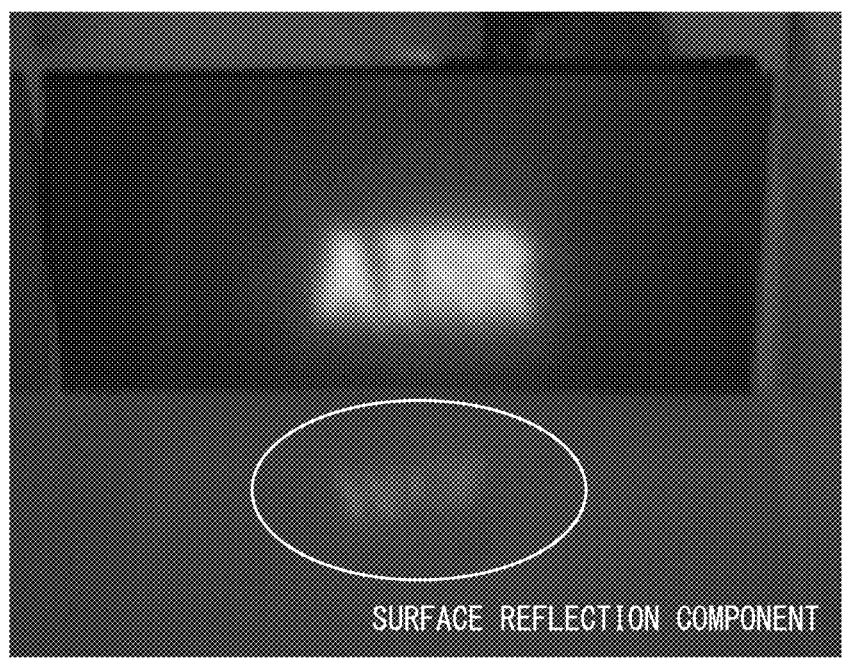
FIG. 24 is a photograph of an aerial image observed in Comparative example 2.

In the display device of the comparative example, when the character "AIRR" was displayed on the display portion 3, it was confirmed that a surface reflection component is observed together with the aerial image I of the character "AIRR" as shown in FIG. 24.

Example 3

Figure 25:
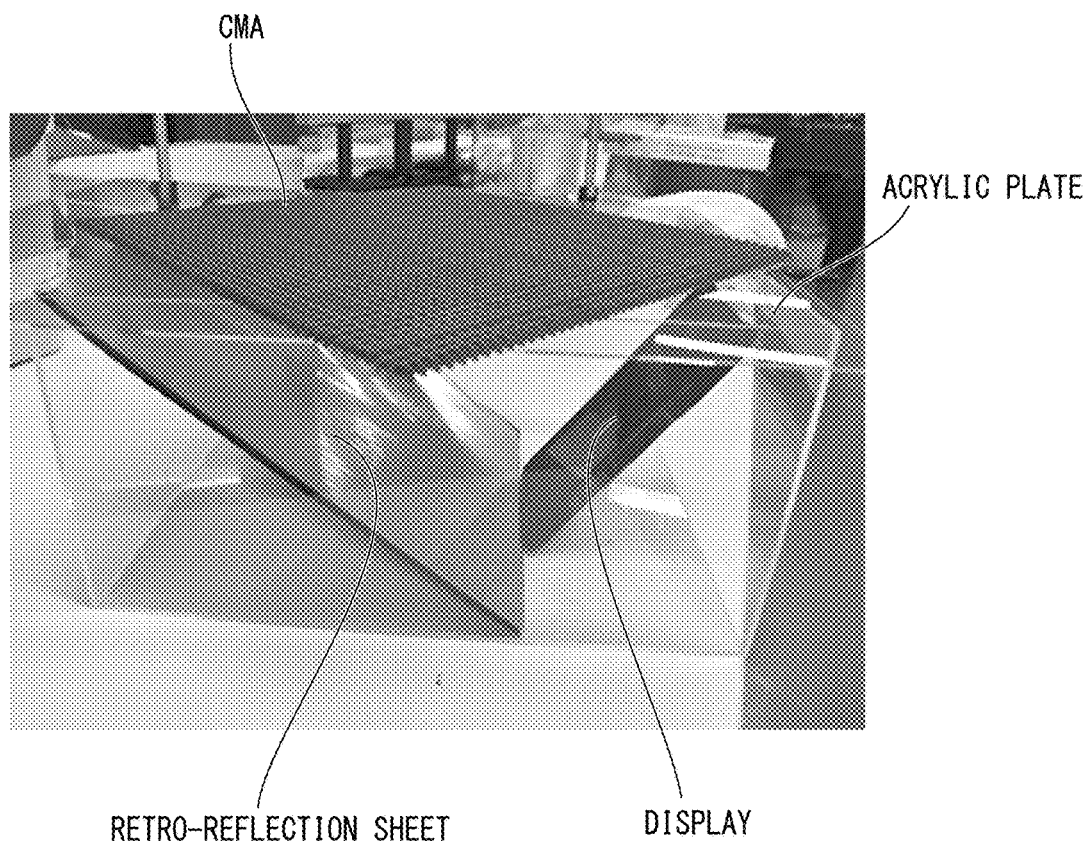
FIG. 25 is a photograph of the display device constituted in Example 3.

Next, a display device 1M shown in FIG. 12 was constructed (refer to FIG. 25). A smartphone, a retro-reflection sheet, and an acrylic plate which are the same as those of Example 2 were used for the display portion 3 having the light source 2, the retro-reflection portion 6, and the light splitting portion 4, respectively. A CMA having an aperture size of 4 mm in length×4 mm in width×4 mm in height was used for the imaging portion 22.

Figure 26:
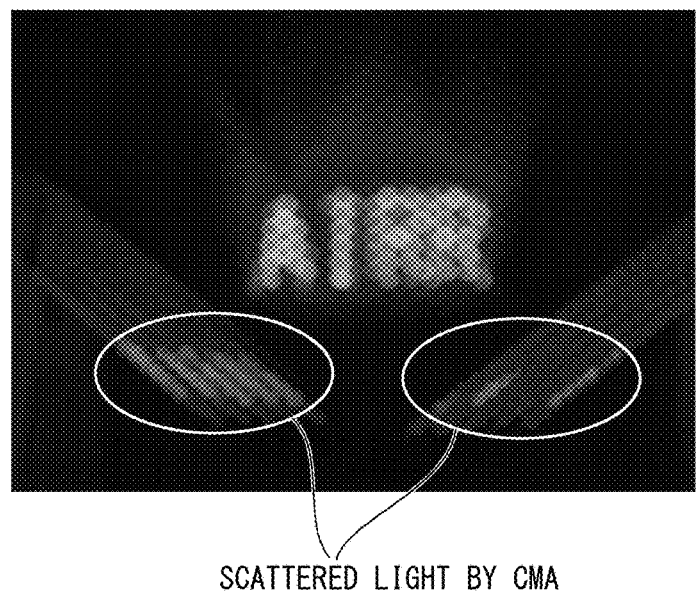
FIG. 26 is a photograph of an aerial image observed in Example 3.

In the constructed display device 1M, when the character "AIRR" was displayed on the display portion 3, it was confirmed that the aerial image I of the character "AIRR" is observed as shown in FIG. 26. In addition, no components due to the surface-reflected light, the reduced images, and so on were observed. In this example, scattered light generated by the CMA is seen, but the scattered light is eliminated by limiting directivity of the first light L1 irradiated to the CMA. As a method of eliminating the scattered light as described above, for example, a method of providing a louver film on the plate surface 3a of the display portion 3, or the like can be used.

Comparative Example 3

The display device shown in FIG. 12 was constructed in the same manner as in Example 3 except that the imaging portion 22 was not provided. That is, the imaging portion 22 was omitted in the display device 1M.

Figure 27:
FIG. 27 is a photograph of an aerial image observed in Comparative example 3.

In the display device of this comparative example, when the character "AIRR" was displayed on the display portion 3, it was confirmed that a surface reflection component is observed together with the aerial image I of the character "AIRR" as shown in FIG. 27.

The invention claimed is:

1. A display device comprising:
   a light source;
   a light splitting portion which is configured to surface-reflect at least some of first emission light emitted from the light source as first reflected light;
   a first retro-reflection portion which is configured to retro-reflect at least some of the first reflected light as retro-reflected light toward the light splitting portion; and
   a first light blocking portion which is configured to block surface-reflected light reflected by the first retro-reflection portion toward an observation position of the retro-reflected light,
   wherein the light splitting portion is configured to transmit at least some of the retro-reflected light retro-reflected by the first retro-reflection portion.

2. The display device according to claim 1, wherein:
   a plurality of light sources are arranged on one plate surface of a display portion formed in a plate shape,
   the light splitting portion is formed in a plate shape and has a light splitting surface, which is configured to surface-reflect at least some of the first emission light as the first reflected light, on one plate surface thereof,
   the one plate surface of the display portion and the light splitting surface face each other,
   a separation distance between the one plate surface of the display portion and the light splitting surface increases from a first end of the display portion to a second end of the display portion,
   the first retro-reflection portion is formed in a plate shape and has a retro-reflection surface, which is configured to retro-reflect at least some of the first reflected light as the retro-reflected light, on one plate surface thereof,
   the retro-reflection surface faces the light splitting surface,
   a first end of the first retro-reflection portion is in a vicinity of an end of the light splitting portion on a side opposite to a side of the display portion, and
   the first retro-reflection portion is curved so that a separation distance between the first retro-reflection portion and an end of the light splitting portion on the side of the display portion decreases from the first end to the second end of the first retro-reflection portion.

3. The display device according to claim 2, wherein:
   the first light blocking portion is formed in a plate shape, disposed on a side of the light splitting surface of the light splitting portion and disposed perpendicular to the light splitting surface, and
   an end of the first light blocking portion on a side of the light splitting portion is disposed on a first virtual line which connects an end of the display portion on a side opposite to the light splitting portion with an end of the light splitting portion on a side of the first retro-reflection portion.

4. The display device according to claim 2, wherein the first light blocking portion is formed in a plate shape, disposed on a side of the display portion opposite to the side of the first retro-reflection portion and protrudes from the light splitting surface of the light splitting portion to approach the display portion in a direction perpendicular to the light splitting surface.

5. The display device according to claim 1, wherein:
   a plurality of light sources are arranged on one plate surface of a display portion formed in a plate shape,
   the light splitting portion is formed in a plate shape and has a light splitting surface, which is configured to surface-reflect at least some of the first emission light as the first reflected light, on one plate surface thereof,
   the one plate surface of the display portion and the light splitting surface face each other,
   a separation distance between the one plate surface of the display portion and the light splitting surface increases from a first end of the display portion to a second end,
   the first retro-reflection portion is formed in a plate shape, disposed in a direction perpendicular to the light splitting surface and has a retro-reflection surface,
   which is configured to retro-reflect at least some of the first reflected light as the retro-reflected light, on one plate surface thereof,
   the retro-reflection surface faces the light splitting surface,
   the first light blocking portion is formed in a plate shape, and
   an end of the first light blocking portion on a side of the light splitting portion is disposed on a second virtual line which extends from an end of the first retro-reflection portion on the side of the light splitting portion toward the light source in a direction parallel to the light splitting surface.

6. The display device according to claim 1, wherein:
   a plurality of light sources are arranged on one plate surface of a display portion formed in a plate shape,
   the light splitting portion is formed in a plate shape and has a light splitting surface, which is configured to surface-reflect at least some of the first emission light as the first reflected light, on one plate surface thereof,
   the one plate surface of the display portion and the light splitting surface face each other,
   a separation distance between the one plate surface of the display portion and the light splitting surface increases from a first end of the display portion to a second end, the first retro-reflection portion is formed in a plate shape, disposed to be spaced apart from a perpendicular axis to the light splitting surface between the display portion and the first retro-reflection portion on the side opposite to the side of the display portion so that a separation distance between the first retro-reflection portion and the perpendicular axis increases at a constant ratio, as moving away from the light splitting portion along the perpendicular axis and has a retro-reflection surface, which is configured to retro-reflect at least some of the first reflected light as the retro-reflected light, on one plate surface thereof, the retro-reflection surface faces the light splitting surface, and an end of the first light blocking portion on a side of the light splitting portion is disposed on a third virtual line which extends from an end of the first retro-reflection portion on a side of the light splitting portion toward the light source in a direction perpendicular to the retro-reflection surface.

7. The display device according to claim 1, wherein:

a plurality of light sources are arranged on one plate surface of a display portion formed in a plate shape, the light splitting portion is formed in a plate shape and has a light splitting surface, which is configured to surface-reflect at least some of the first emission light as the first reflected light, on one plate surface thereof, the one plate surface of the display portion and the light splitting surface face each other, a separation distance between the one plate surface of the display portion and the light splitting surface increases from a first end of the display portion to a second end, a second retro-reflection portion is further included, the second retro-reflection portion is formed in a plate shape, disposed to be spaced apart from a perpendicular axis to the light splitting surface between the display portion and the second retro-reflection portion on the side opposite to the side of the display portion so that a separation distance between the second retro-reflection portion and the perpendicular axis decreases at a constant ratio, as moving away from the light splitting portion along the perpendicular axis and has a retro-reflection surface, which is configured to retro-reflect at least some of the first reflected light as the retro-reflected light, on one plate surface thereof, a retro-reflection surface of the second retro-reflection portion faces the one plate surface of the display portion and the light splitting surface, a plurality of protruding portions which protrude from the retro-reflection surface of the second retro-reflection portion toward the light source in a direction parallel to the light splitting surface are disposed at predetermined intervals along the retro-reflection surface of the second retro-reflection portion, the first retro-reflection portion has a retro-reflection surface on one plate surface thereof and is provided on a light splitting surface side of the protruding portions, and the first light blocking portion is provided on surfaces of the protruding portions on a side opposite to a side of the light splitting surface.

8. The display device according to claim 1, wherein:

a plurality of light sources are arranged on one plate surface of a display portion formed in a plate shape, the light splitting portion is formed in a plate shape and has a light splitting surface, which is configured to surface-reflect at least some of the first emission light as the first reflected light, on one plate surface thereof, the one plate surface of the display portion and the light splitting surface face each other, a separation distance between the one plate surface of the display portion and the light splitting surface increases from a first end of the display portion to a second end of the display portion, the first retro-reflection portion is formed in a plate shape and has a retro-reflection surface, which is configured to retro-reflect at least some of the first reflected light as the retro-reflected light, on one plate surface thereof, a first end of the first retro-reflection portion is in the vicinity of the light splitting surface and is disposed to approach the display portion from a first end of the display portion toward a second end of the display portion, the retro-reflection surface faces a side of the light splitting surface, and the first light blocking portion is provided on a plate surface of the first retro-reflection portion on a side opposite to the retro-reflection surface.

9. The display device according to claim 1, further comprising a second light blocking portion which is configured to block direct irradiation light directly irradiated to the observation position of the retro-reflected light from the light source, wherein the light splitting portion is configured to transmit at least some of the direct irradiation light.

10. The display device according to claim 8, wherein the second light blocking portion is provided in a region, in which the direct irradiation light is transmitted, on a side of the light splitting portion opposite to a side of the light source.

11. A display device comprising:

a light source;

a light splitting portion which is configured to surface-reflect at least some of first emission light emitted from the light source as first reflected light;

a first retro-reflection portion which is configured to retro-reflect at least some of the first reflected light as retro-reflected light toward the light splitting portion; and a second light blocking portion which is configured to block direct irradiation light directly irradiated to an observation position of the retro-reflected light from the light source, wherein the light splitting portion is configured to transmit at least some of the retro-reflected light retro-reflected by the first retro-reflection portion.

12. A display device comprising:

a display portion formed in a plate shape and has a light source on one plate surface thereof;

a light splitting portion formed in a plate shape, disposed on a first emission axis which indicates an emission direction of first emission light emitted from the light source, disposed so that one plate surface thereof is inclined with respect to the one plate surface of the display portion, configured to transmit at least some of the first emission light as first transmitted light and has a light splitting surface which is configured to surface-reflect at least some of the retro-reflected light, on the one plate surface thereof;

a first retro-reflection portion formed in a plate shape, having a retro-reflection surface, which is configured to retro-reflect at least some of the first transmitted light transmitted through the light splitting portion as retro-reflected light, on one plate surface thereof, and disposed on the first emission axis so that the retro-reflection surface is parallel to the light splitting surface of the light splitting portion while facing the display portion with the light splitting portion interposed therebetween; and an imaging portion formed in a plate shape, disposed on a first retro-reflection portion side of the light splitting portion along one plate surface of the light splitting portion, and configured to surface-reflect and image retro-reflected light retro-reflected by the first retro-reflection portion.

13. A display device comprising:
a display portion formed in a plate shape and has a light source on one plate surface thereof;
a light splitting portion formed in a plate shape, disposed on a first emission axis which indicates an emission direction of first emission light emitted from the light source, having a light splitting surface, which is configured to surface-reflect at least some of the first emission light as first reflected light, on the one plate surface thereof, and disposed so that the light splitting surface is opposed and inclined with respect to the one plate surface of the display portion;
a first retro-reflection portion formed in a plate shape, having a retro-reflection surface, which is configured to retro-reflect at least some of the first reflected light surface-reflected by the light splitting surface as retro-reflected light, on one plate surface thereof, and disposed on a second emission axis which indicates a traveling direction of the first reflected light so that the retro-reflection surface is opposed and inclined with respect to the light splitting surface and the retro-reflection surface is perpendicular to one plate surface of the display portion; and
an imaging portion formed in a plate shape, disposed on a side of the light splitting portion opposite to a side of the first retro-reflection portion along one plate surface of the light splitting portion, and configured to transmit retro-reflected light retro-reflected by the first retro-reflection portion and to image the first emission light,
wherein the light splitting portion is configured to transmit at least some of the retro-reflected light.

14. A method for displaying an aerial image, comprising:
emitting first emission light from a light source and reflecting at least some of the first emission light at a position on a first emission axis, which indicates an emission direction of the first emission light, as first reflected light toward a first retro-reflection portion with a light splitting portion;
retro-reflecting at least some of the first reflected light at a position on a second emission axis, which indicates an emission direction of the first reflected light, as retro-reflected light toward the light splitting portion by the first retro-reflection portion;
transmitting at least some of the retro-reflected light at the light splitting portion; and
blocking surface-reflected light reflected by the first retro-reflection portion to an observation position of the retro-reflected light by a first light blocking portion.

15. The method for displaying an aerial image according to claim 14, further comprising blocking direct irradiation light directly irradiated to the observation position of the retro-reflected light from the light source by a second light blocking portion.

16. A method for displaying an aerial image, comprising:
emitting first emission light from a light source and reflecting at least some of the first emission light at a position on a first emission axis, which indicates an emission direction of the first emission light, as first reflected light toward a first retro-reflection portion by a light splitting portion;
retro-reflecting at least some of the first reflected light at a position on a second emission axis, which indicates an emission direction of the first reflected light, as retro-reflected light toward the light splitting portion by the retro-reflection portion;
transmitting at least some of the retro-reflected light at the light splitting portion; and
blocking direct irradiation light directly irradiated to an observation position of the retro-reflected light from the light source by a second light blocking portion.

17. The display device according to claim 1, wherein:
a plurality of light sources are arranged on one plate surface of a display portion formed in a plate shape,
the light splitting portion is formed in a plate shape and has a light splitting surface, which is configured to surface-reflect at least some of the first emission light as the first reflected light, on one plate surface thereof,
the one plate surface of the display portion and the light splitting surface face each other,
a separation distance between the one plate surface of the display portion and the light splitting surface increases from a first end of the display portion to a second end,
the first retro-reflection portion is formed in a plate shape, disposed to be spaced apart from a perpendicular axis to the light splitting surface between the display portion and the first retro-reflection portion on the side opposite to the side of the display portion so that a separation distance between the first retro-reflection portion and the perpendicular axis changes, as moving away from the light splitting portion along the perpendicular axis and has a retro-reflection surface, which is configured to retro-reflect at least some of the first reflected light as the retro-reflected light, on one plate surface thereof,
the retro-reflection surface faces the light splitting surface, and
an end of the first light blocking portion on a side of the light splitting portion is disposed on a third virtual line which extends from an end of the first retro-reflection portion on a side of the light splitting portion toward the light source in a direction perpendicular to the retro-reflection surface.

18. The display device according to claim 1, wherein:
a plurality of light sources are arranged on one plate surface of a display portion formed in a plate shape,
the light splitting portion is formed in a plate shape and has a light splitting surface, which is configured to surface-reflect at least some of the first emission light as the first reflected light, on one plate surface thereof,
the one plate surface of the display portion and the light splitting surface face each other,
a separation distance between the one plate surface of the display portion and the light splitting surface increases from a first end of the display portion to a second end,
a second retro-reflection portion is further included,
the second retro-reflection portion is formed in a plate shape, disposed to be spaced apart from a perpendicular axis to the light splitting surface between the display portion and the second retro-reflection portion on the side opposite to the side of the display portion so that a separation distance between the second retro-reflection portion and the perpendicular axis changes, as moving away from the light splitting portion along the perpendicular axis and has a retro-reflection surface, which is configured to retro-reflect at least some of the first reflected light as the retro-reflected light, on one plate surface thereof, a retro-reflection surface of the second retro-reflection portion faces the one plate surface of the display portion and the light splitting surface, a plurality of protruding portions which protrude from the retro-reflection surface of the second retro-reflection portion toward the light source in a direction parallel to the light splitting surface are disposed at predetermined intervals along the retro-reflection surface of the second retro-reflection portion, the first retro-reflection portion has a retro-reflection surface on one plate surface thereof and is provided on a light splitting surface side of the protruding portions, and the first light blocking portion is provided on surfaces of the protruding portions on a side opposite to a side of the light splitting surface.

* * * * *